US011770599B2

(12) United States Patent
Lei et al.

(10) Patent No.: US 11,770,599 B2
(45) Date of Patent: *Sep. 26, 2023

(54) TECHNIQUES TO SET FOCUS IN CAMERA IN A MIXED-REALITY ENVIRONMENT WITH HAND GESTURE INTERACTION

(71) Applicant: Microsoft Technology Licensing, LLC, Redmond, WA (US)

(72) Inventors: Maria Cheng Lei, Bellevue, WA (US); Vishal Jain, Bellevue, WA (US); Vikramaditya Dangi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/573,613

(22) Filed: Jan. 11, 2022

(65) Prior Publication Data
US 2022/0141379 A1    May 5, 2022

Related U.S. Application Data

(63) Continuation of application No. 16/933,413, filed on Jul. 20, 2020, now Pat. No. 11,245,836, which is a
(Continued)

(51) Int. Cl.
*H04N 5/232* (2006.01)
*H04N 23/62* (2023.01)
(Continued)

(52) U.S. Cl.
CPC .............. *H04N 23/62* (2023.01); *G02B 7/28* (2013.01); *G02B 27/0172* (2013.01);
(Continued)

(58) Field of Classification Search
USPC ......................................... 348/345, 349, 352
See application file for complete search history.

(56) References Cited

U.S. PATENT DOCUMENTS

| 2015/0003819 A1* | 1/2015 | Ackerman | ......... H04N 5/23212 |
| | | | 396/51 |
| 2018/0246698 A1* | 8/2018 | Huang | ..................... H04R 1/32 |

OTHER PUBLICATIONS

"Notice of Allowance Issued in South African Patent Application No. 2021/07562", dated Nov. 9, 2022, 1 page.

\* cited by examiner

*Primary Examiner* — Anthony J Daniels
(74) *Attorney, Agent, or Firm* — WORKMAN NYDEGGER

(57) ABSTRACT

An adjustable-focus PV (picture/video) camera in a mixed-reality head-mounted display (HMD) device operates with an auto-focus subsystem that is configured to be triggered based on location and motion of a user's hands to reduce the occurrence of auto-focus hunting during camera operations. The HMD device is equipped with a depth sensor that is configured to capture depth data from the surrounding physical environment to detect and track the user's hand location, movements, and gestures in three-dimensions. The hand tracking data from the depth sensor may be assessed to determine hand characteristics—such as which of the user's hands or part of a hand is detected, its size, motion, speed, etc.—within a particular region of interest (ROI) in the field of view of the PV camera. The auto-focus subsystem uses the assessed hand characteristics as an input to control auto-focus of the PV camera to reduce auto-focus hunting occurrences.

20 Claims, 22 Drawing Sheets

Related U.S. Application Data continuation of application No. 16/427,398, filed on May 31, 2019, now Pat. No. 10,798,292.

(51) Int. Cl.
  *G02B 7/28* (2021.01)
  *G02B 27/01* (2006.01)
  *G06F 3/01* (2006.01)
  *G06F 3/04845* (2022.01)
  *G06T 11/60* (2006.01)

(52) U.S. Cl.
  CPC .......... *G06F 3/017* (2013.01); *G06F 3/04845* (2013.01); *G06T 11/60* (2013.01); *G02B 2027/014* (2013.01); *G02B 2027/0138* (2013.01)

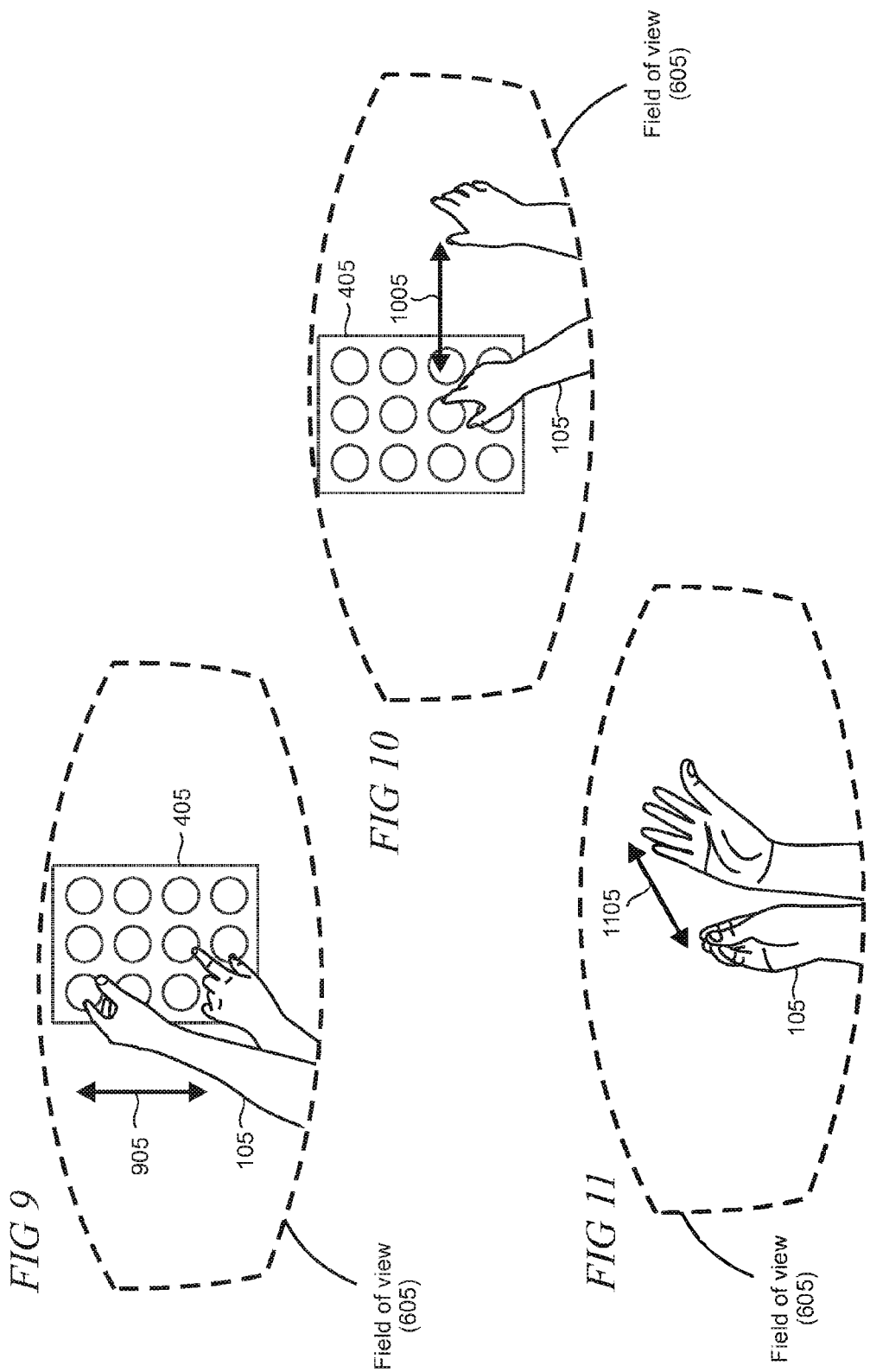

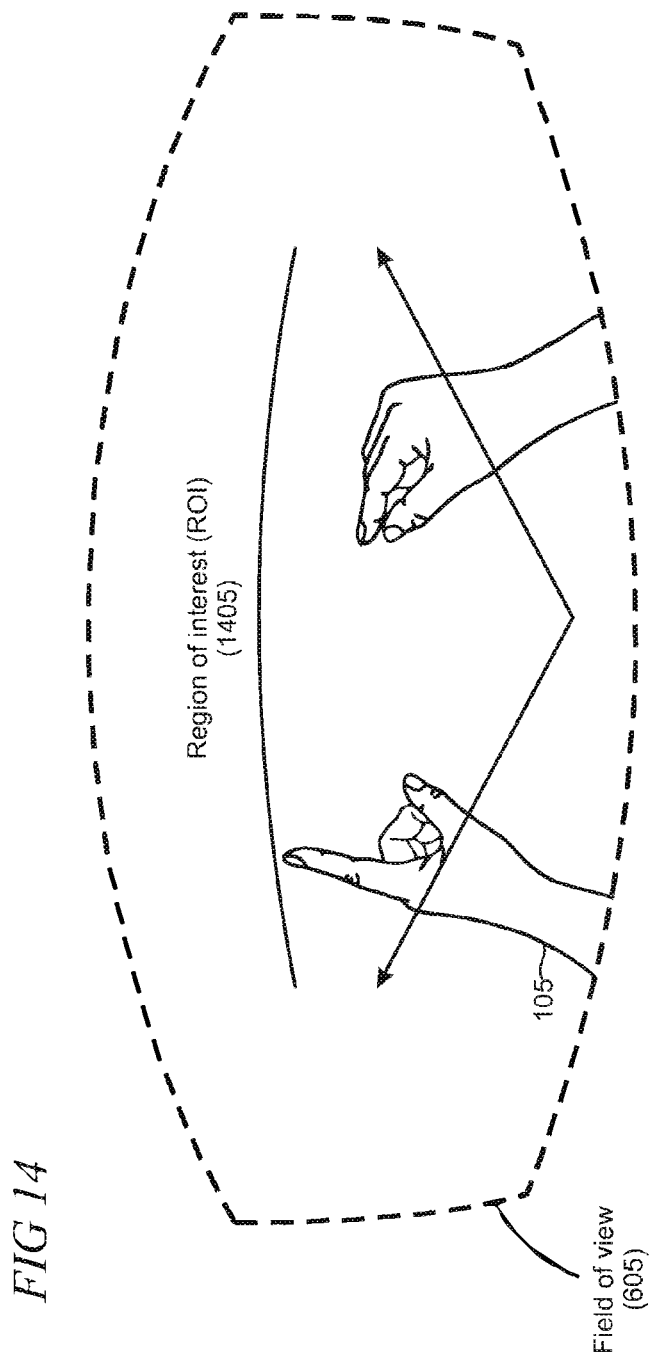

FIG 18

- 1805 — Characteristics of hands used by the auto-focus subsystem in determining whether to trigger or disable auto-focus operations
- 1810 — Pace of hand movements within and surrounding the ROI
- 1815 — Duration of time that the one or more hands are positioned within the ROI and are statically located (e.g., within a certain region)
- 1820 — Size of the detected hands
- 1825 — Hand pose (e.g., does hand pose indicate a device input)
- 1830 — Direction of motion (e.g., back and forth, side to side, in and out, diagonal, etc.)
- 1835 — Which user hand is detected (left or right)
- 1840 — What part of the hand is detected
- 1845 — Other characteristics

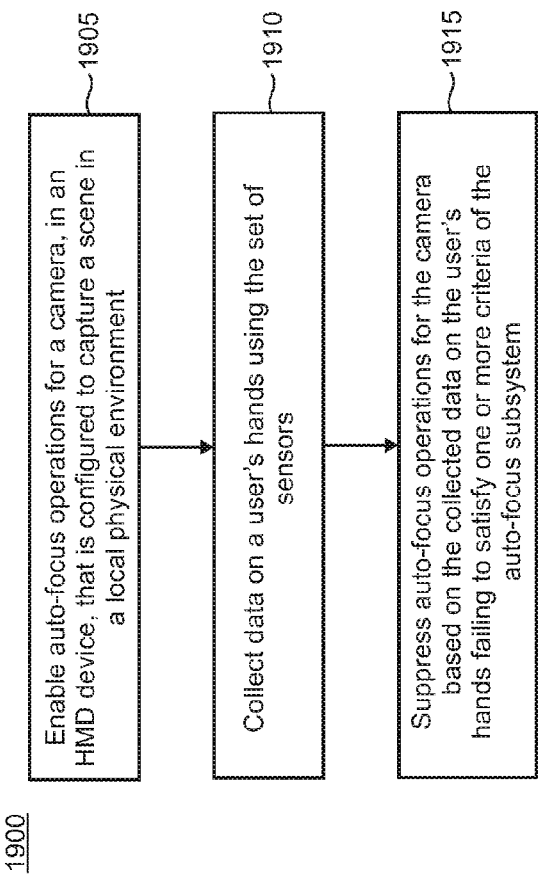

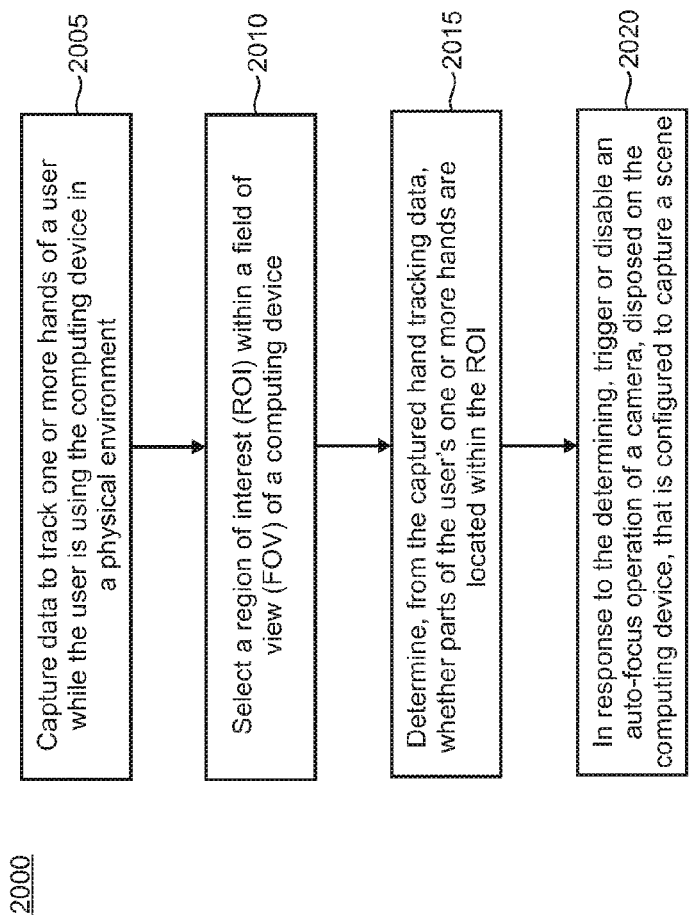

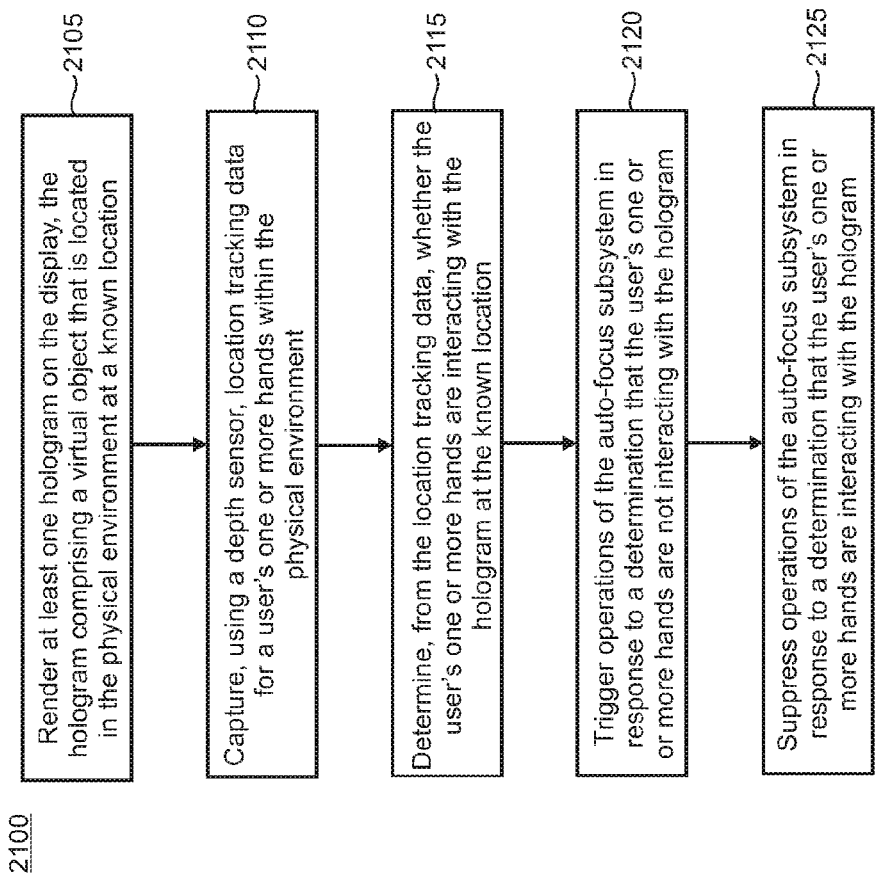

TECHNIQUES TO SET FOCUS IN CAMERA IN A MIXED-REALITY ENVIRONMENT WITH HAND GESTURE INTERACTION

CROSS-REFERENCE TO RELATED APPLICATION

This application is a continuation of and claims priority to U.S. Ser. No. 16/933,413, filed Jul. 20, 2020, entitled, "TECHNIQUES TO SET FOCUS IN CAMERA IN A MIXED-REALITY ENVIRONMENT WITH HAND GESTURE INTERACTION," which is a continuation of and claims priority to U.S. Ser. No. 16/427,398 (now U.S. Pat. No. 10,798,292), filed May 31, 2019, entitled, "TECHNIQUES TO SET FOCUS IN CAMERA IN A MIXED-REALITY ENVIRONMENT WITH HAND GESTURE INTERACTION," both of which are incorporated herein by reference in their entireties.

BACKGROUND

Mixed-reality head-mounted display (HMD) devices can employ photo and video (PV) cameras that capture still and/or video images of a surrounding physical environment to facilitate a variety of user experiences including mixed-reality experience recording and sharing. The PV cameras can include auto-focus, auto-exposure, and auto-balance functions. In some scenarios, hand movements of the HMD device user may cause the auto-focus subsystem to hunt while attempting to resolve a sharp image of a physical environment. For example, movement of the user's hands when interacting with a hologram that is rendered by the HMD device can cause the camera to refocus each time that the hands are detected by the camera in the scene. This auto-focus hunting effect can reduce the quality of the user experience for both the local HMD device user and remote users who may be watching the mixed-reality user experience captured at the local HMD device.

SUMMARY

An adjustable-focus PV camera in a mixed-reality head-mounted display (HMD) device operates with an auto-focus subsystem that is configured to be triggered based on location and motion of a user's hands to reduce the occurrence of auto-focus hunting during PV camera operations. The HMD device is equipped with a depth sensor that is configured to capture depth data from the surrounding physical environment to detect and track the user's hand location, movements, and gestures in three-dimensions. The hand tracking data from the depth sensor may be assessed to determine hand characteristics—such as which of the user's hands or part of hand is detected, its size, motion, speed, etc.—within a particular region of interest (ROI) in the field of view (FOV) of the PV camera. The auto-focus subsystem uses the assessed hand characteristics as an input to control auto-focus of the PV camera to reduce the occurrence of auto-focus hunting. For example, if the hand tracking indicates that the user is employing hand motions while interacting with a hologram, the auto-focus subsystem can suppress triggering of auto-focus to reduce the hunting effect.

Reducing auto-focus hunting can be beneficial since it can be an undesirable distraction to the HMD device user (who may sense frequent PV camera lens motion), and also cause degradation in quality of images and videos captured by the PV camera. Reducing auto-focus hunting can also improve the operations of the HMD device by reducing power consumed by the auto-focus motors or other mechanisms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 9-11 show illustrative hand motions and gestures from the perspective of the local user in the FOV of the local HMD device;

FIG. 14 shows an illustrative region of interest (ROI) in the HMD device's FOV from the local user's perspective using a spherical coordinate system;

FIG. 18 shows a taxonomy of illustrative characteristics used by the auto-focus subsystem in determining whether to trigger or suppress auto-focus;

FIGS. 19-21 are flowcharts of illustrative methods performed by an HMD device or other suitable electronic device that employs an auto-focus subsystem;

Like reference numerals indicate like elements in the drawings. Elements are not drawn to scale unless otherwise indicated.

DETAILED DESCRIPTION

Figure 1:
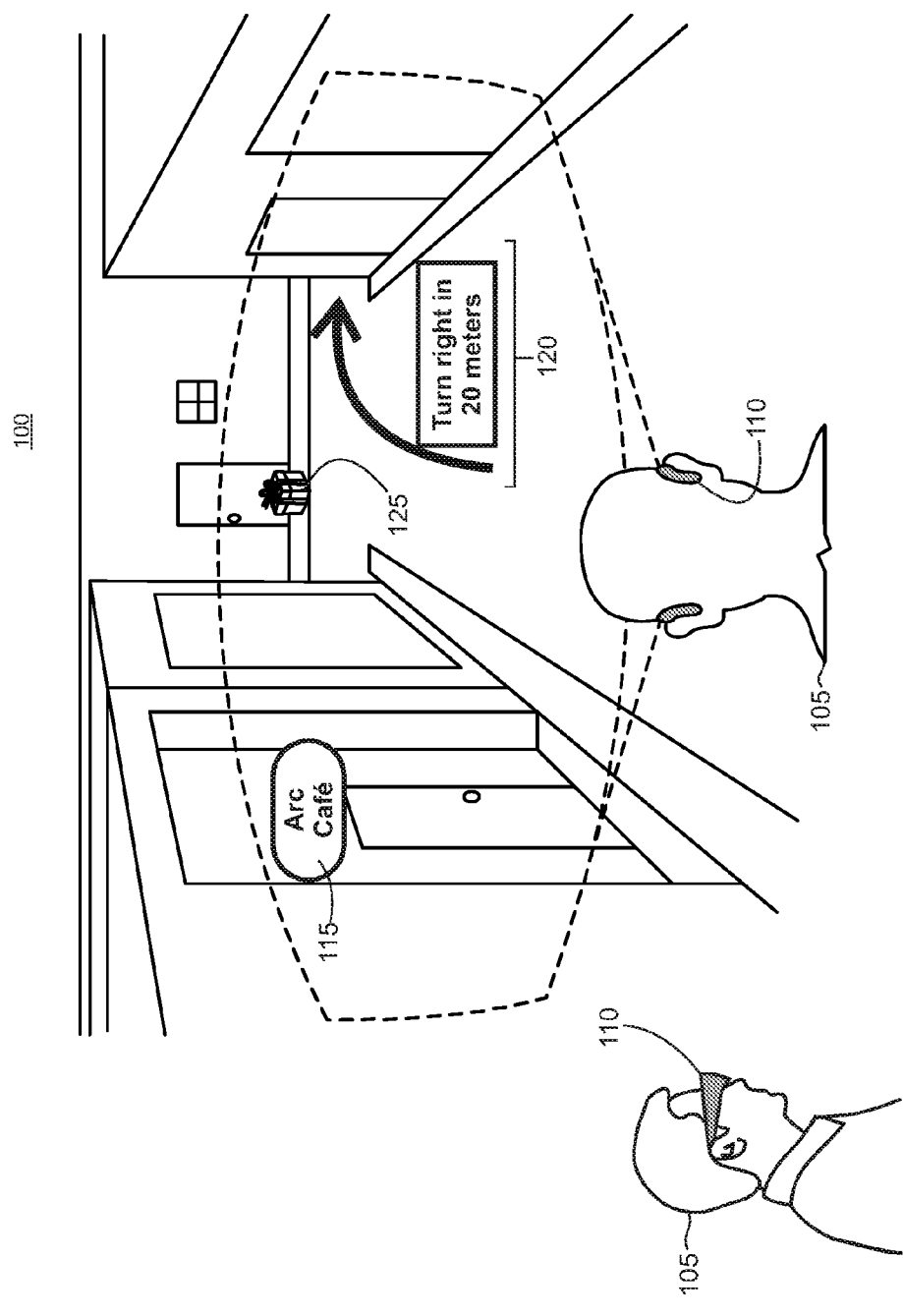
FIG. 1 shows an illustrative mixed-reality environment in which holograms are rendered on a see-through mixed-reality display system of a head-mounted display (HMD) device while a user views a surrounding physical environment.

FIG. 1 shows an illustrative mixed-reality environment 100 supported on an HMD device 110 that combines real-world elements and computer-generated virtual objects to enable a variety of user experiences. A user 105 can employ the HMD device 110 to experience a mixed-reality environment 100 that is rendered visually on a see-through mixed-reality display system and which may include audio and/or tactile/haptic sensations in some implementations. In this particular non-limiting example, the HMD device user is physically walking in a real-world urban area that includes city streets with various buildings, stores, etc. The field of view (FOV) (represented by the dashed area in FIG. 1), from the user's perspective, of the see-through mixed-reality display system of the real-world cityscape provided by the HMD device changes as the user moves through the environment and the device can render holographic virtual objects over the real-world view. Here, the holograms include various virtual objects including a tag 115 that identifies a business, directions 120 to a place of interest in the environment, and a gift box 125. The virtual objects in the FOV coexist with real objects in the three-dimensional (3D) physical environment to create the mixed-reality experience. The virtual objects can be positioned relative to the real-world physical environment, such as the gift box on the sidewalk, or be positioned relative to the user, such as directions that move with the user.

Figure 2:
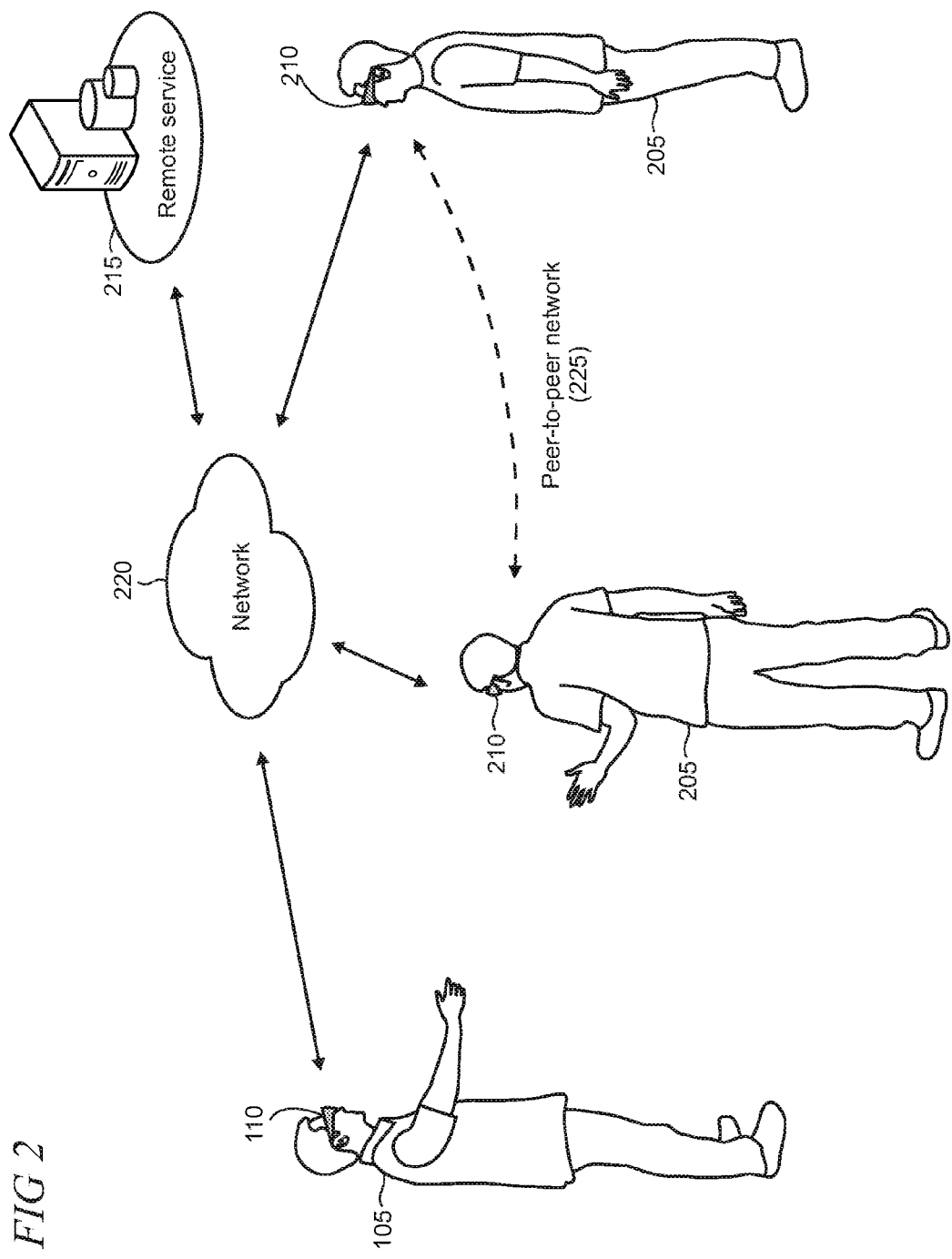
FIG. 2 shows an illustrative environment in which a local HMD device, remote HMD devices, and a remote service can communicate over a network.

FIG. 2 shows an illustrative environment in which local and remote HMD devices can communicate with each other and a remote service 215 over a network 220. The network may be comprised of various networking devices to enable communications between the computing devices, and can include any one or more of a local area network, wide area network, the Internet, the world wide web, etc. In some embodiments, an ad hoc (e.g., peer-to-peer) network between devices can be created using, for example, Wi-Fi, Bluetooth®, or near field communication (NFC), as representatively shown by the dashed arrow 225. The local user 105 can operate the local HMD device 110 which can communicate with remote HMD devices 210 operated by respective remote users 205. The HMD devices can perform various tasks like a typical computer (e.g., a personal computer, smartphone, tablet computer, etc.) and can perform additional tasks based on the HMD device's configuration. Tasks can include sending e-mails or other messages, searching the web, transmitting pictures or videos, interacting with holograms, transmitting a live stream of a surrounding physical environment using a camera, among other tasks.

The HMD devices 110 and 210 can communicate with remote computing devices and services, such as the remote service 215. The remote service may be, for example, a cloud computing platform set up in a datacenter which can enable the HMD devices to leverage the various solutions offered by the remote service, such as artificial intelligence (AI) processing, data storage, data analytics, etc. While FIG. 2 shows HMD devices and servers, the HMD devices can also communicate with other types of computing devices, such as smartphones, tablet computers, laptops, personal computers, and the like (not shown). For example, a user experience that is implemented on the local HMD device can be shared with remote users, as discussed below. Images and video of mixed-reality scenes that a local user sees on his or her HMD device, along with sound and other experiential elements, can be received and rendered on a laptop computer at a remote location.

Figure 3:
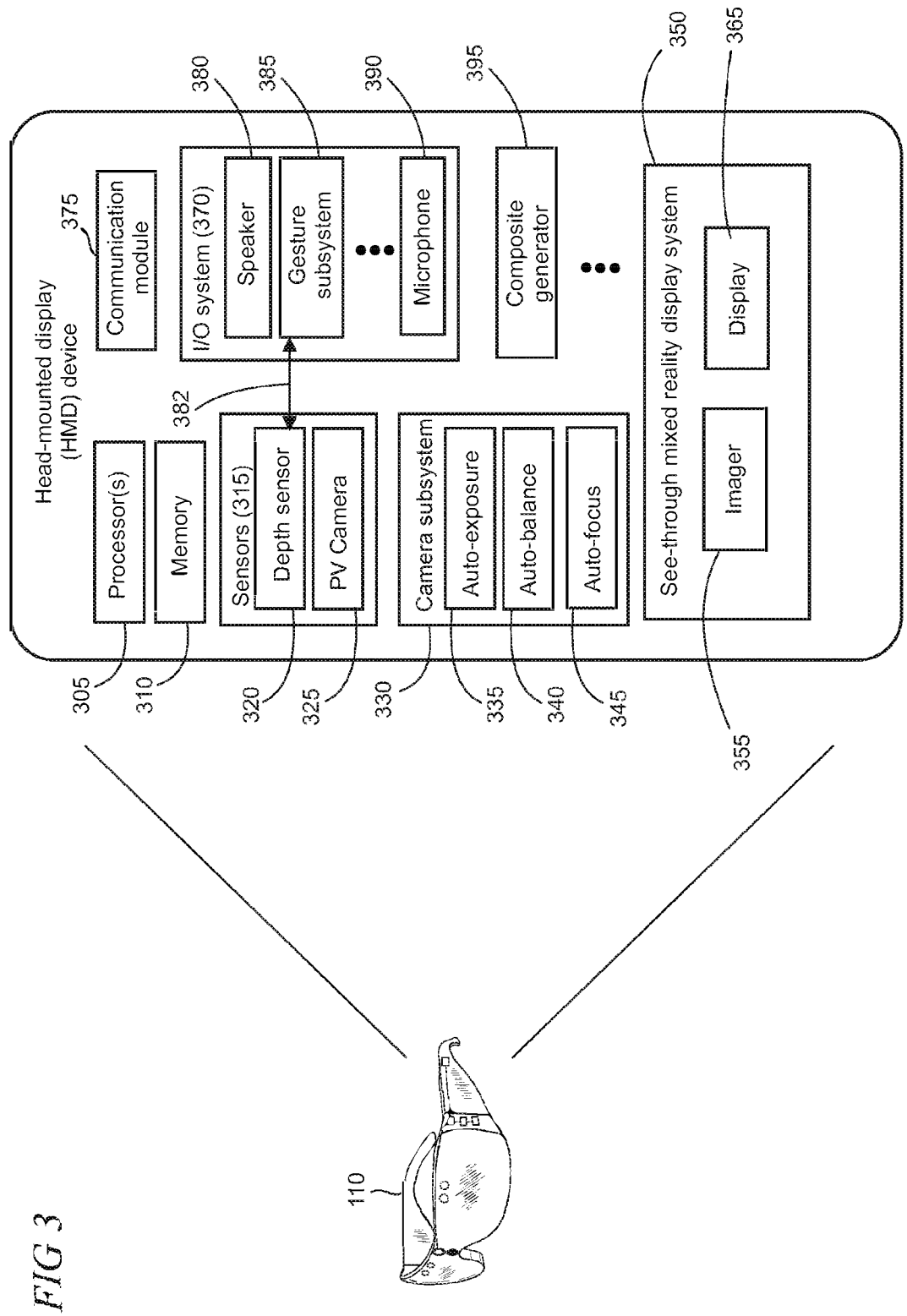
FIG. 3 shows an illustrative architecture of an HMD device.

FIG. 3 shows an illustrative system architecture of an HMD device, such as the local HMD device 110. While various components are depicted in FIG. 3, the components listed are non-exhaustive and other components not shown which facilitate the functions of the HMD device are also possible, such as a global positioning system (GPS), other input/output devices (keyboard and mouse), etc. The HMD device may have one or more processors 305, such as a central processing unit (CPU), graphics processing unit (GPU), and an artificial intelligence (AI) processing unit. The HMD device can have memory 310 which can store data and instructions which are executable by the processor(s) 305. The memory can include short-term memory devices like random access memory (RAM) and can also include long-term memory devices like flash storage and a solid-state drive (SSD).

The HMD device 110 can include an I/O (input/output) system 370 comprised of various components so the user can interact with the HMD device. Exemplary and non-exhaustive components include a speaker 380, a gesture subsystem 385, and a microphone 390. As representatively shown by arrow 382, the gesture subsystem can interoperate with a depth sensor 320 which can gather depth data about the user's hands and thereby enable the HMD device to perform hand tracking.

The depth sensor 320 can pass the gathered data about the hands to the gesture subsystem 385 which handles operations associated with user hand movements and gestures. The user can have interactions with holograms on the display of the HMD device, such as move a hologram, select a hologram, shrink or enlarge a hologram (e.g., with a pinching motion), among other interactions. Exemplary holograms the user may control include buttons, menus, images, results from a web-based search, and character figures, among other holograms.

A see-through mixed-reality display system 350 may include a micro-display or an imager 355 and a mixed-reality display 365 such as a waveguide-based display that uses surface relief gratings to render virtual objects on the HMD device 110. The processor 305 (e.g., an image processor) may be operatively connected to the imager 355 to provide image data, such as video data so that images may be displayed using a light engine and waveguide display 365. In some implementations, the mixed-reality display may be configured as a near-eye display that includes an exit pupil expander (EPE) (not shown).

The HMD device 110 can include many types of sensors 315 to provide a user with an integrated and immersive experience into a mixed-reality environment. Depth sensor 320 and picture/video (PV) camera 325 are exemplary sensors shown, but other sensors not shown are also possible, such as infrared sensors, pressure sensors, motion sensors, etc. The depth sensor may operate using various types of depth sensing techniques such as structured light, passive stereo, active stereo, time-of-flight, pulsed time-of-flight, phased time-of-flight, or Light Detection and Ranging (LIDAR). Typically, the depth sensors work with an IR (infrared) light source, although some sensors can operate with RGB (red, green, blue) light sources. Generally, depth sensors sense distances to a target and build an image that represents external surface properties of a target or physical environment using a point cloud representation. The point cloud data points or structure may be stored in memory either locally, at a remote service, or a combination thereof.

The PV camera 325 may be configured with adjustable focus to capture images, record video of the physical environment surrounding the user, or transmit content from the HMD device 110 to a remote computing device, such as remote HMD device 210 or other computing device (e.g., tablet or personal computer). The PV camera may be implemented as an RGB camera to capture scenes within the three-dimensional (3D) physical space in which the HMD device operates.

The camera subsystem 330 associated with the HMD device may be used at least in part for the PV camera and can include an auto-exposure subsystem 335, auto-balance subsystem 340, and an auto-focus subsystem 345. The auto-exposure subsystem can perform automatic adjustments of the image brightness according to the amount of light that reaches the camera sensor. The auto-balance subsystem can automatically compensate color differences based on lighting so that white colors are appropriately displayed. The auto-focus subsystem can ensure that captured and rendered images are sharp by focusing the lens of the PV camera, which is typically implemented by mechanical movement of the lens relative to an image sensor.

The composite generator 395 creates composite content that combines scenes of the physical world captured by the PV camera 325 and images of virtual objects generated by the HMD device. The composite content can be recorded or transmitted to remote computing devices such as HMD devices, personal computers, laptops, tablets, smartphones, and the like. In typical implementations, the images are non-holographic 2D representations of the virtual objects. However, in alternative implementations, data can be transmitted from a local HMD device to a remote HMD device to enable remote rendering of holographic content.

The communication module 375 may be used for transmitting and receiving information to and from external devices, such as the remote HMD devices 210, the remote service 215, or other computing devices. The communication module can include, for example, a network interface controller (NIC) for wireless communications with a router or similar networking device, or radios that supports one or more of Wi-Fi, Bluetooth™, or near filed communication (NFC) transmissions.

Figure 4:
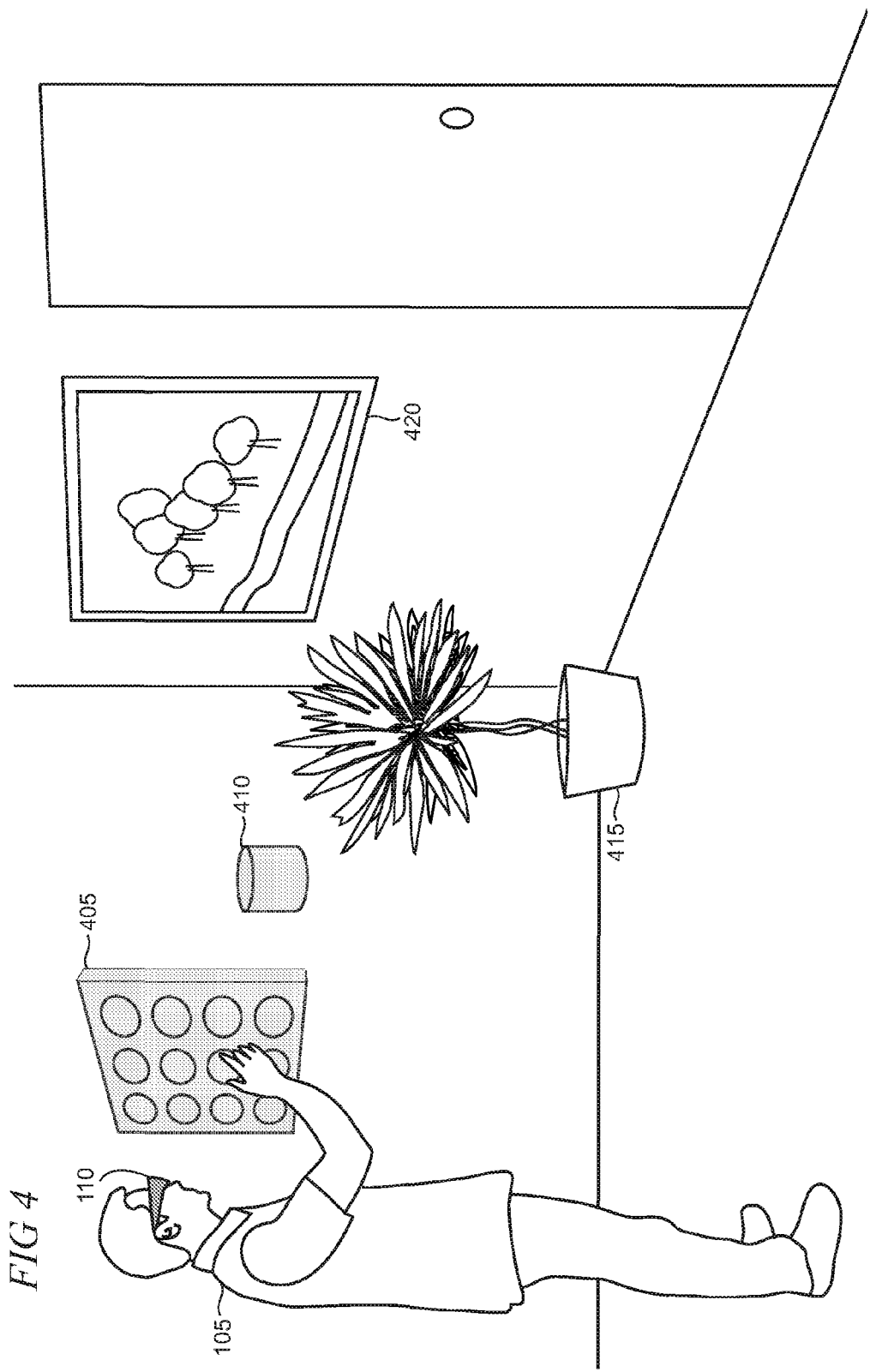
FIGS. 4 and 5 show the local user in a physical environment interacting with illustrative virtual objects.
Figure 5:
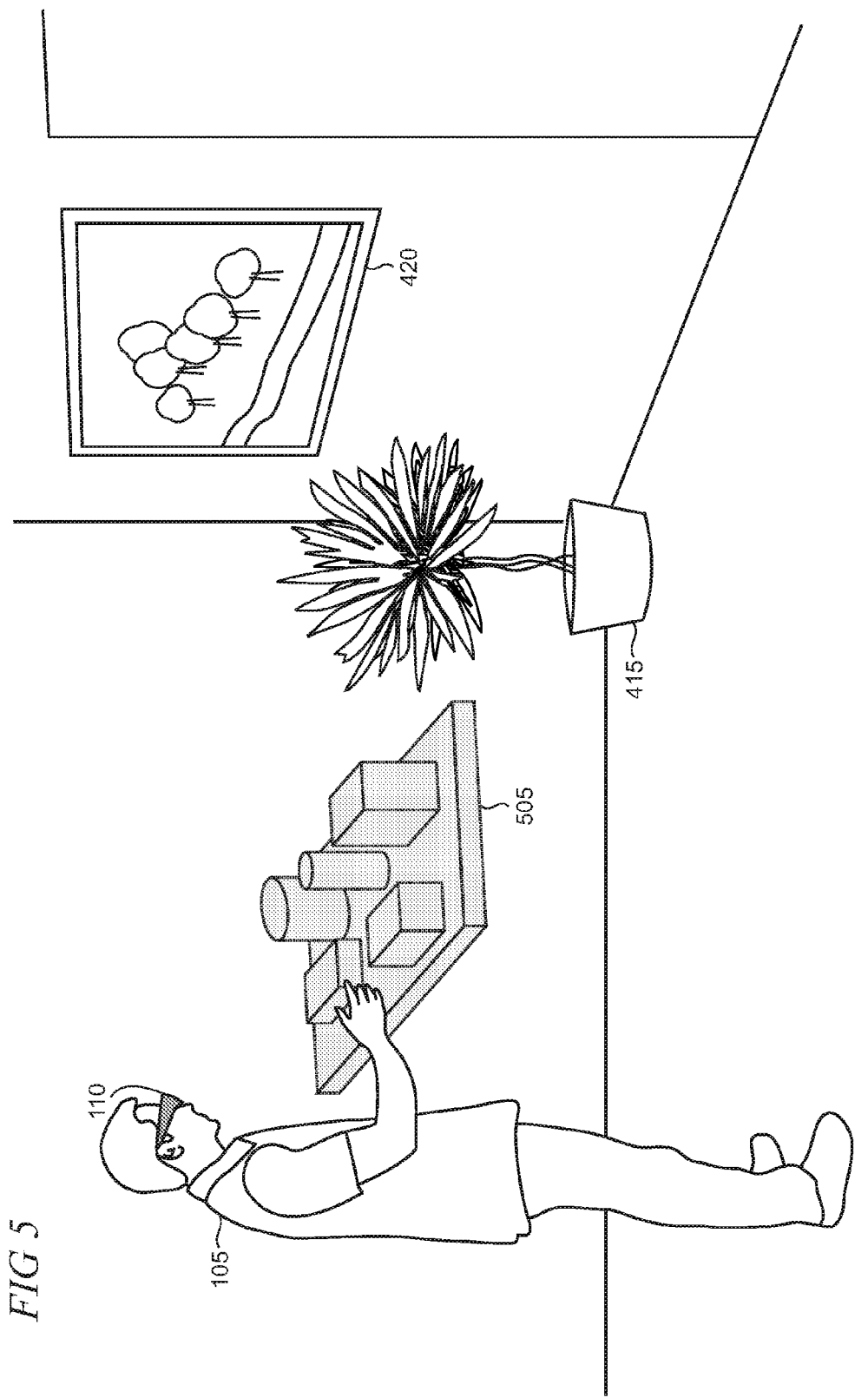

FIGS. 4 and 5 show an illustrative physical environment in which the user 105 interacts with holographic virtual objects that are viewable by the user through the see-through mixed-reality display system on the HMD device (it is noted that the holographic virtual objects in this illustrative example can only be viewed through an HMD device and are not, for example, projected into free space to allow viewing by the naked eye). In FIG. 4, virtual objects include a vertically oriented panel 405 and cylindrical object 410. In FIG. 5, the virtual objects include a horizontally oriented virtual building model 505. The virtual objects are positioned in various locations relative to the 3D space of the physical environment which includes a plant 415 and picture 420. Although not labeled, the floors, walls, and door are also part of the real physical environment.

Figure 6:
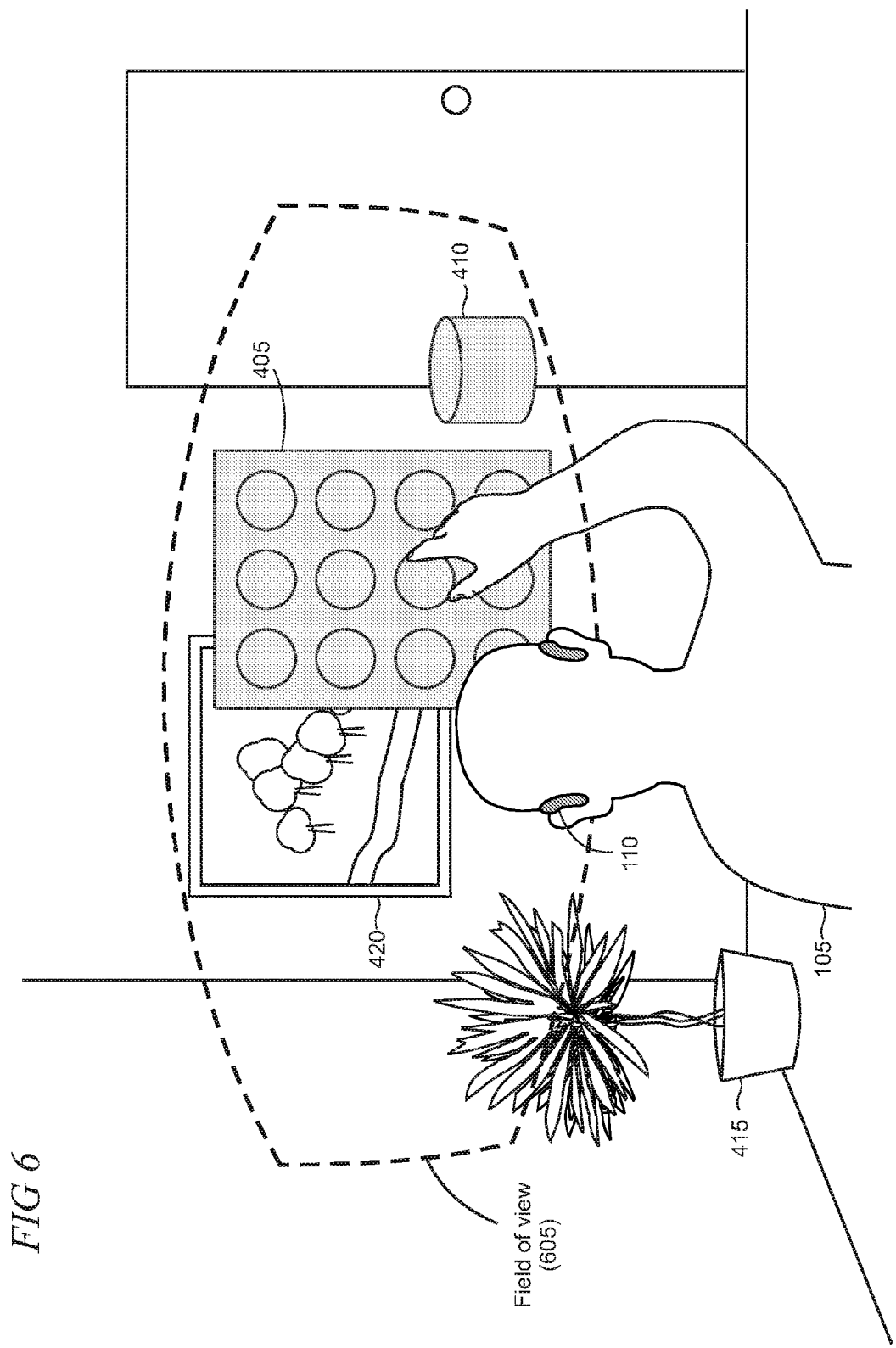
FIG. 6 shows an illustrative FOV of the local HMD device from the local user's perspective that includes a view of the physical environment over which virtual objects are rendered using a mixed-reality display system.

FIG. 6 shows a field of view (FOV) 605 of an illustrative mixed-reality scene as viewed using the see-through display from the HMD device user's perspective. The user 105 can see portions of the physical world and the holograms of the virtual objects 405 and 410 generated by the local HMD device 110. Holograms may be positioned anywhere in the physical environment but are typically located between one-half to five meters from the user to minimize user discomfort from vergence-accommodation conflict, for example. The user typically interacts with the holograms using a mix of up and down, side to side, and in and out hand motions, as shown in FIGS. 9-11 and described in the accompanying text. The interactions can occur at some spatial distance away from a location of the rendered holograms in some implementations. For example, a virtual button exposed on a virtual object may be pushed by the user by making a tapping gesture a distance away from the object. The particular user-hologram interactions that are utilized for a given implementation can vary.

Figure 7:
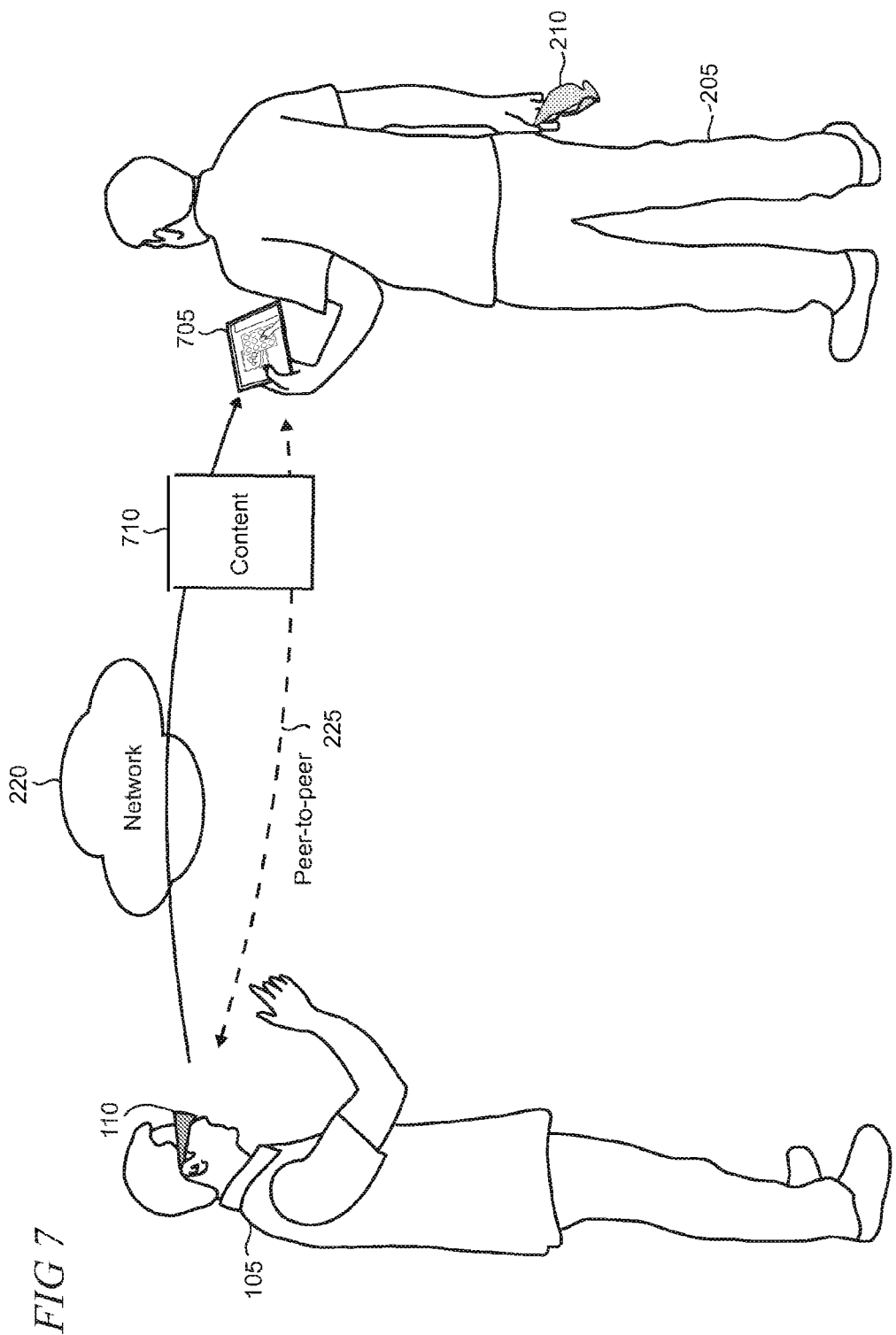
FIG. 7 shows an illustrative arrangement in which content is shared from a local HMD device user to a remote user.
Figure 8:
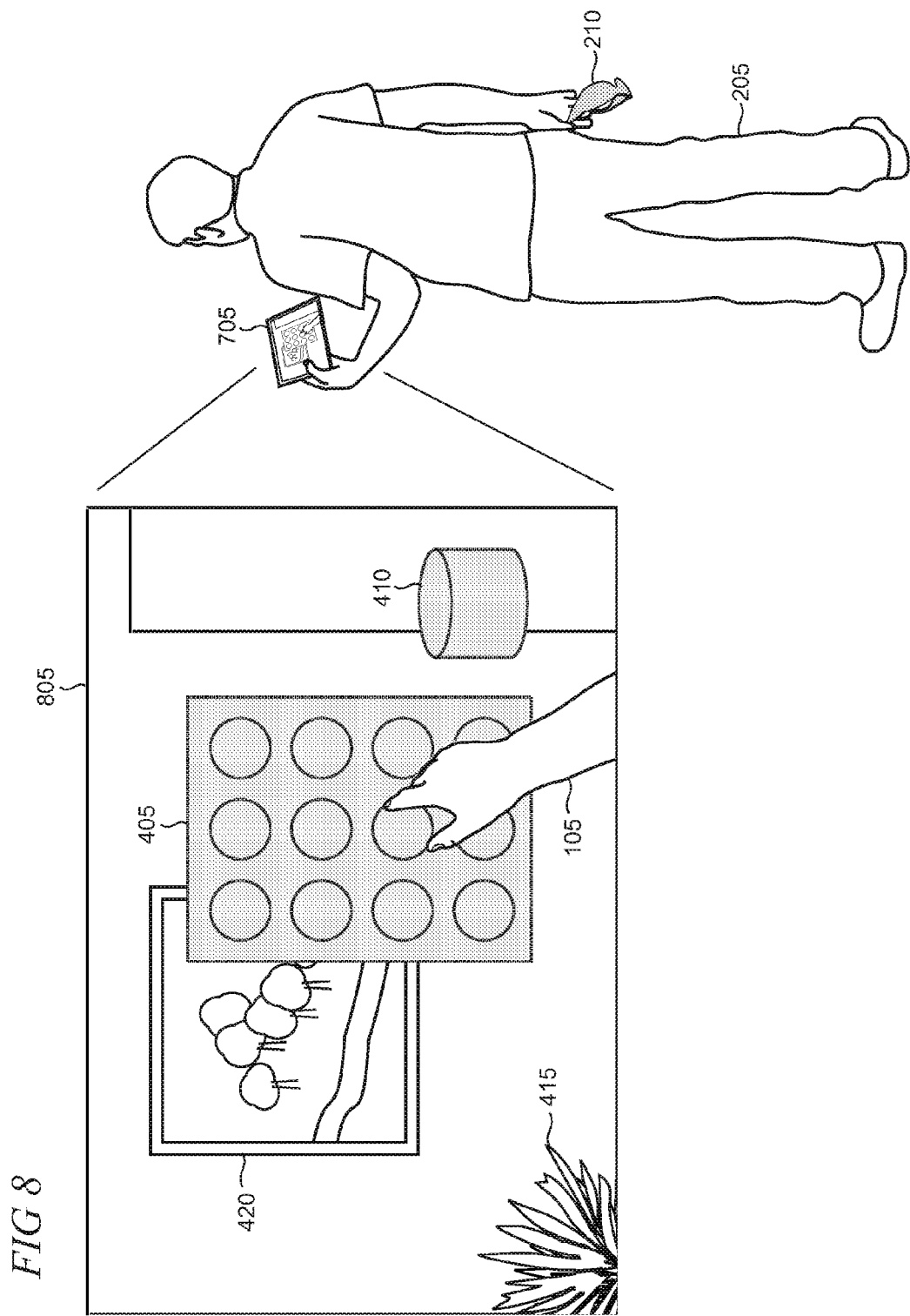
FIG. 8 shows a remote user operating a remote tablet computer that displays composite images including real-world elements and virtual objects that are transmitted from the local user's HMD device.

FIG. 7 shows an illustrative environment in which the remote user 205 operates a remote tablet device 705 which renders content 710 from the local user's HMD device 110. In this example, the rendering includes composite content that comprises a scene of the local user's physical environment that is captured by the PV camera on the local HMD device and 2D non-holographic renderings of the virtual objects 405 and 410. As shown in FIG. 8, the composite rendering 805 is substantially similar to what the local user views through the see-through mixed-reality display on the local HMD device. The remote user can thus see the hands of the local user interacting with the virtual object 405 and portions of the surrounding physical environment including the plant, wall, picture, and door. The received content at the remote device 705 can include still images and/or video that is streamed in real time or include recorded content. In some implementations, the received content can include data that enables remote rendering of 3D holographic content.

FIGS. 9-11 show exemplary hand motions and gestures that can be made by the local user 105 while operating the local HMD device 110. FIG. 9 shows the user's vertical (e.g., up and down) hand movements as the user manipulates the virtual object 405, as representatively shown by numeral 905. FIG. 10 shows the user's horizontal (e.g., left to right) hand movements to manipulate the virtual object 405, as representatively shown by numeral 1005. FIG. 11 shows the user's in and out movements within the mixed-reality space, for example by performing a "bloom" gesture, as representatively shown by numeral 1105. Other directional movements not shown in FIGS. 9-11 are also possible while the user operates the local HMD device, such as circular movements, figurate movements, various hand gestures which include manipulating the user's fingers, etc.

Figure 13:
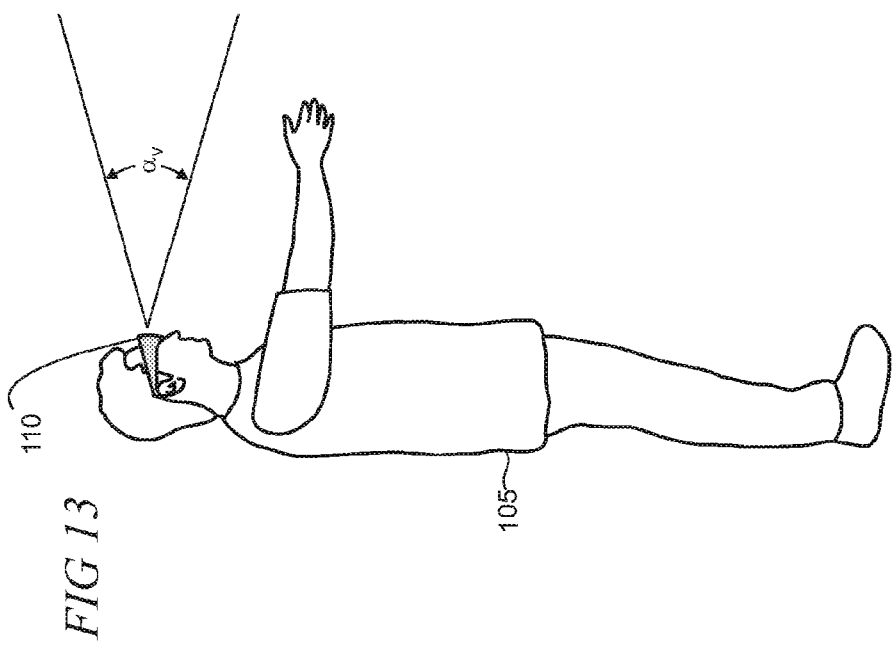
FIGS. 12 and 13 show an illustrative spherical coordinate system describing horizontal and vertical FOVs.
Figure 12:
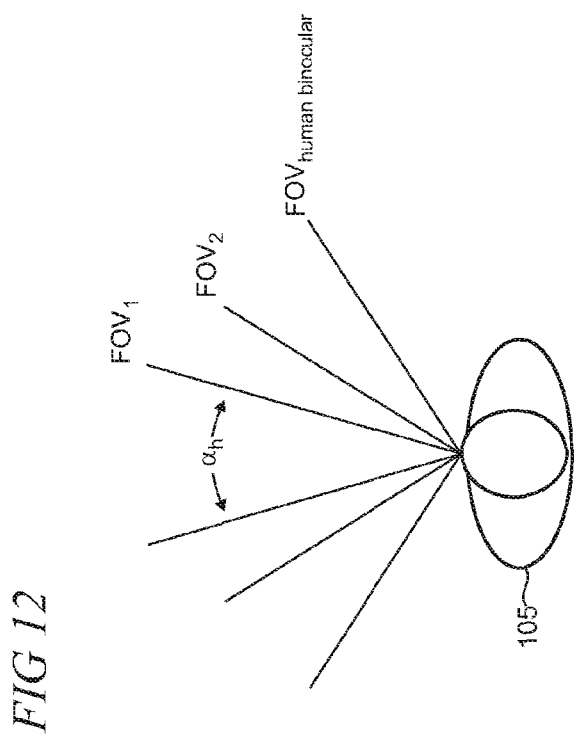

FIGS. 12 and 13 show an illustrative spherical coordinate system describing horizontal and vertical fields of view (FOVs). In typical implementations, the spherical coordinate system may utilize a radial distance from the user to a point in the 3D space, an azimuthal angle from the user to the point in the 3D space, and a polar (or elevation/altitude) angle between the user and the point in the 3D space to coordinate points in the physical environment. FIG. 12 shows an overhead view of the user which depicts horizontal FOVs associated with the various sensors, displays, and components in the local HMD device 110. The horizontal FOV has an axis that runs parallel to the ground with its origin located, for example, at the HMD device between the user's eyes. Different components can have different angular horizontal FOVs, $\alpha_h$, which are typically narrower relative to the user's human binocular FOV. FIG. 13 shows a side view of the user which depicts a vertical FOV, $\alpha_v$, associated with the various sensors, displays, and components in the local HMD device, in which the vertical FOV axis runs perpendicular to the ground and has an origin at the HMD device. The angular vertical FOV for components in the HMD device can also vary.

FIG. 14 shows an illustrative HMD device FOV 605 in which an exemplary region of interest (ROI) 1405 is shown. The ROI is a statically or dynamically defined region in the HMD device FOV 605 (FIG. 6) which the auto-focus subsystem of the HMD device 110 can utilize in determining whether or not to focus on hand movements or gestures. The ROI displayed in FIG. 14 is for illustration purposes and, in typical implementations, the user is unaware of the ROI while viewing content on the see-through mixed-reality display on the local HMD device.

The ROI 1405 can be implemented as a 3D spatial region that can be described using spherical or rectangular coordinates. Using the spherical coordinate system, the ROI, in some implementations, can be dynamic according to measured distances from the user and the affect distance has on the azimuthal and polar angles. Typically, the ROI may be located at a central region [TT1] of the display system FOV as that is a likely location at which the user gazes, but the ROI may be at any location within the display system FOV, such as at an off-centered location. The ROI can have a static location, size, and shape with respect to the FOV or, in some embodiments, can be dynamically located, sized, and shaped. Thus, the ROI can be of any static or dynamic 2D shape or 3D volume depending on the implementation. During interactions with holograms of the virtual objects, the hands of the user 105 in FIG. 14 may be located within the ROI which is defined by a set of spherical coordinates.

Figure 15:
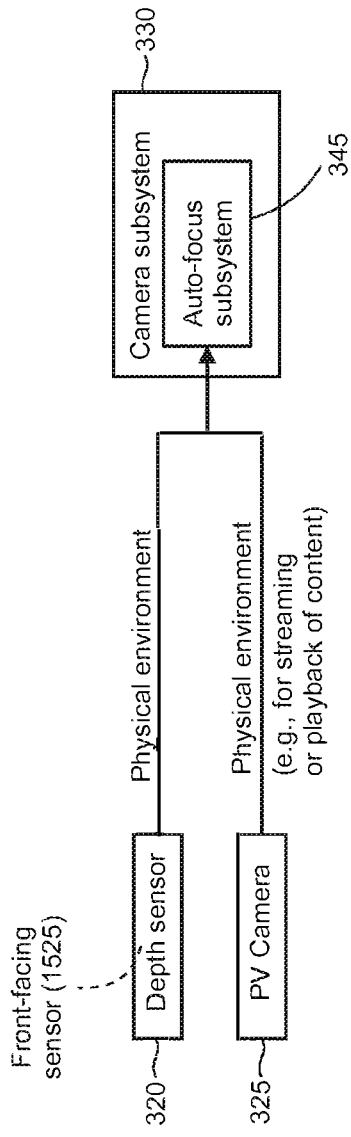
FIG. 15 is a diagram in which various data is illustratively provided as inputs into an auto-focus subsystem of the local HMD device.

FIG. 15 shows an illustrative diagram in which data is fed into the auto-focus subsystem 345 of the camera subsystem 330. The auto-focus subsystem collectively utilizes this data to control the auto-focus operations to reduce the auto-focus hunting effect created by hand movements during interactions with the rendered holographic virtual objects.

Data fed into the auto-focus subsystem includes data describing the physical environment from the PV camera 325 and a depth sensor 320 or other front-facing sensor 1525. The data from the front-facing sensor can include depth data when captured by the depth sensor 320, but other sensors can also be utilized to capture the user's surrounding physical environment. Thus, the term front-facing sensor 1525 is utilized herein to reflect the utilization of one or more of a depth sensor, camera, or other sensor that captures the physical environment and, as discussed in greater detail below, the user's hand movements and gestures.

Figure 16:
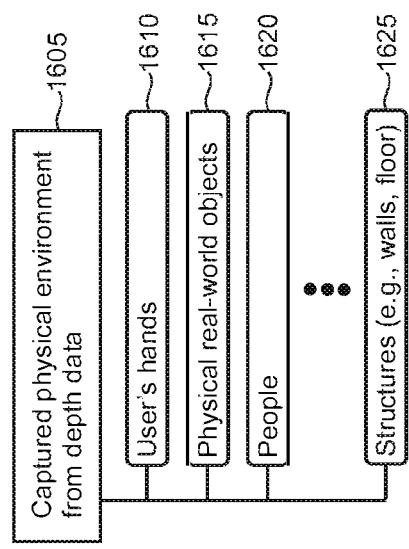
FIG. 16 shows a taxonomy of illustrative items of the physical environment which can be detected by the local HMD device's depth sensor.

FIG. 16 shows a taxonomy of illustrative items that may be picked up and gathered by the front-facing sensor 1525, such as depth data, from the physical environment, as representatively shown by numeral 1605. Items that can be picked up by the front-facing sensor 1525 can include the user's hands 1610, physical real-world objects (e.g., chairs, bed, couch, table) 1615, people 1620, structures (e.g., walls, floor) 1625, among other objects. While the front-facing sensor may or may not recognize the objects from the gathered data, spatial mapping of the environment can be performed based on the collected data. The HMD device may be configured to detect and recognize hands, however, to enable gesture inputs and to further influence the auto-focus operations discussed herein. The captured data shown in FIG. 15 which is transmitted to the auto-focus subsystem includes hand data associated with the user of the HMD device, as discussed in greater detail below.

Figure 17:
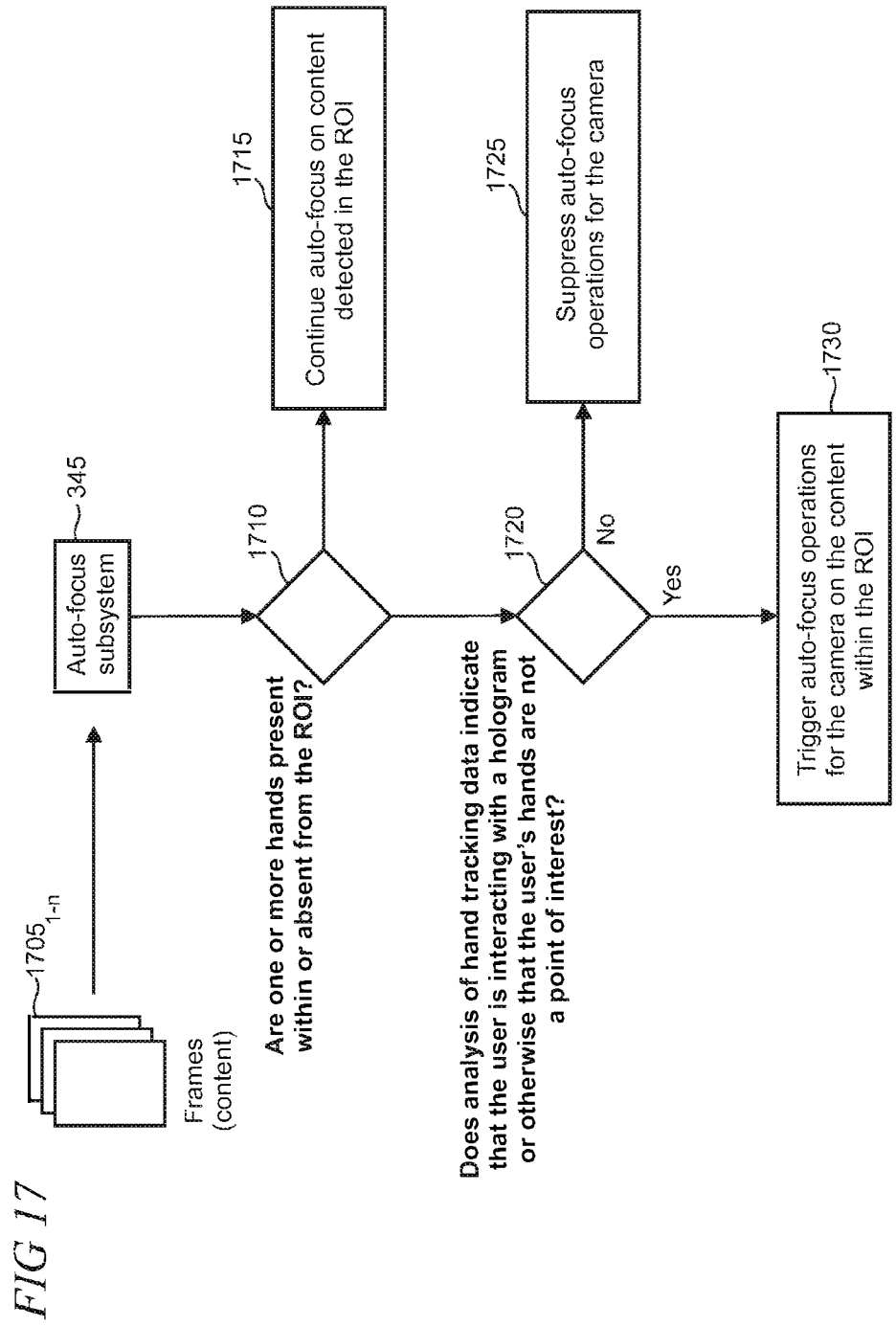
FIG. 17 shows an illustrative process performed by the auto-focus subsystem of the local HMD device when processing frames of content.

FIG. 17 shows an illustrative diagram in which the auto-focus subsystem 345 receives recorded frames of content 1705 (e.g., for streaming content, recording video, or capturing images) and, using captured hand data, auto-focuses on the frames of content. The auto-focus subsystem may be configured with one or more criteria that, upon satisfaction or dissatisfaction, are determinative as to whether the HMD device triggers or suppresses an auto-focus operation.

An auto-focus operation may comprise the auto-focus subsystem automatically focusing on the content within the ROI of the display FOV (FIG. 14). The satisfaction of the criteria may indicate, for example, that the user is using his hands in a manner in which the user wishes to clearly view his hands and the hands are a focus point for the user within the ROI. For example, if the user is interacting with holograms in the ROI, then the auto-focus subsystem may not want to focus on the user's hands because the user's hands are used in passing to control the hologram but the hologram is still the user's main point of interest. In other embodiments, the user's hands may be transitory to the ROI and thereby not a point of interest for focusing on. Conversely, if the user is using his hands in a manner distinct from the holograms, such as to create a new hologram or open a menu, then the auto-focus subsystem may elect to focus on the user's hands. The set criteria provide aid to the auto-focus subsystem to smartly focus on or not focus on the user's hands and thereby reduce the hunting effect and increase the quality of the recorded content during live streaming for a remote user or playback for the local user. In short, the implementation of the criteria helps determine whether the user's hands are a point of interest to the user within the FOV.

In step 1710, the auto-focus subsystem determines whether one or more hands are present within or absent from the ROI. The auto-focus subsystem may obtain data about the hands from the depth sensor 320 or another front-facing sensor 1525. The gathered hand data may be coordinated to a corresponding location on the display FOV to assess a location of the user's physical hands relative to the ROI. This may be performed on a per frame basis or using a group of frames.

In step 1715, when one or more of the user's hands are absent from the ROI, the auto-focus subsystem continues to operate as normal by auto-focusing on the environment detected in the ROI. In step 1720, when one or more hands are detected within the ROI, the auto-focus subsystem determines whether characteristics of the hands indicate that the user is interacting with a hologram or otherwise that the user's hands are not a point of interest. In step 1730, when the user's hands are determined to be a point of interest, the auto-focus subsystem triggers an auto-focus operation for the camera on the content within the ROI. In step 1725, when the user's hands are determined not to be a point of interest, the auto-focus subsystem suppresses auto-focus operations for the camera.

FIG. 18 shows a taxonomy of illustrative hand characteristics that are used by the auto-focus subsystem to determine whether to trigger or disable auto-focus operations, as representatively shown by numeral 1805. Characteristics can include the pace of hand movements within and surrounding the ROI 1810, using which, the auto-focus subsystem triggers or suppresses a focus operation when the captured hand data indicates that the hand's pace meets or surpasses or fails to meet or surpass a pre-set speed limit (e.g., in meters per second). Thus, for example, an auto-focus operation may be suppressed even if a hand is present inside the ROI if the hand data indicates that the hand's pace meets the pre-set speed limit. This prevents a lens from engaging in a hunting effect when the user sporadically moves his hand in front of the front-facing sensor or the hands are otherwise transitory.

Another characteristic that can influence whether to trigger or disable an auto-focus operation includes the duration of time that the one or more hands are positioned within the ROI and are statically located (e.g., within a certain region of the ROI) 1815. Auto-focus operations may be disabled when one or more hands are not statically located for a duration of time that satisfies a pre-set threshold limit (e.g., 3 seconds). Conversely, auto-focus operations can be executed when one or more hands are statically located in the ROI or within a region of the ROI for a duration of time that satisfies the pre-set threshold time limit.

A size of the detected hands 1820 can also be utilized to determine whether to trigger or disable auto-focus operations. Using the size of the user's hands as a criterion in the auto-focus subsystem determination can help prevent, for example, another user's hands from influencing the auto-focus operation. The user's hand pose (e.g., does hand pose indicate a device input) 1825 can be used by the auto-focus subsystem to determine whether to trigger or suppress auto-focus operations. For example, while certain poses may be irrelevant or sporadic hand movements, some hand poses can be used for inputs or can be recognized as the user pointing to something. Hand poses which are identified as being productive may be a reason for the auto-focus subsystem to focus on the user's hands.

Direction of motion (e.g., back and forth, side to side, in and out, diagonal, etc.) 1830 can be utilized to determine whether to trigger or suppress auto-focus operations. Which of the user's hands is detected in the front-facing sensor FOV (e.g., left or right hand) 1835 and what part of the hand is detected 1840 can also be used in determining whether to trigger or suppress auto-focus operations. For example, one hand may be more deterministic as to the user's point of interest in the ROI. For example, the user may typically use one hand to interact with holograms, and therefore that hand is not necessarily a point of interest. In contrast, the opposite hand may be used to open a menu, be used as a pointer within the mixed-reality space, or otherwise is a point of interest to the user. Other characteristics 1845 not shown can also be used as criteria in determining whether to trigger or suppress auto-focus operations.

FIGS. 19-21 are flowcharts of illustrative methods 1900, 2000, and 2100, that may be performed using the local HMD device 110 or other suitable computing device. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1905, in FIG. 19, a local HMD device enables auto-focus operations for a camera that is configured to capture a scene in a local physical environment surrounding the local HMD device over a field of view (FOV). In step 1910, the local HMD device collects data on a user's hands using a set of sensors. In step 1915, the local HMD device suppresses auto-focus operations for the camera based on the collected data on the user's hands failing to satisfy one or more criteria of the auto-focus subsystem.

In step 2005, in FIG. 20, a computing device captures data to track one or more hands of a user while using the computing device in a physical environment. In step 2010, the computing device selects a region of interest (ROI) within a field of view (FOV) of the computing device. In step 2015, the computing device determines, from the captured hand tracking data, whether parts of the user's one or more hands are located within the ROI. In step 2020, the computing device triggers or disables an auto-focus operation of a camera, disposed on the computing device, that is configured to capture a scene.

In step 2105, in FIG. 21, a computing device renders at least one hologram on the display, the hologram comprising a virtual object that is located in the physical environment at a known location. In step 2110, the computing device captures, using a depth sensor, location tracking data for a user's one or more hands within the physical environment. In step 2115, the computing device determines, from the location tracking data, whether the user's one or more hands are interacting with the hologram at the known location. In step 2120, the computing device triggers operations of the auto-focus subsystem in response to a determination that the user's one or more hands are not interacting with the hologram. In step 2125, the computing device suppresses operations of the auto-focus subsystem in response to a determination that the user's one or more hands are interacting with the hologram.

Figure 22:
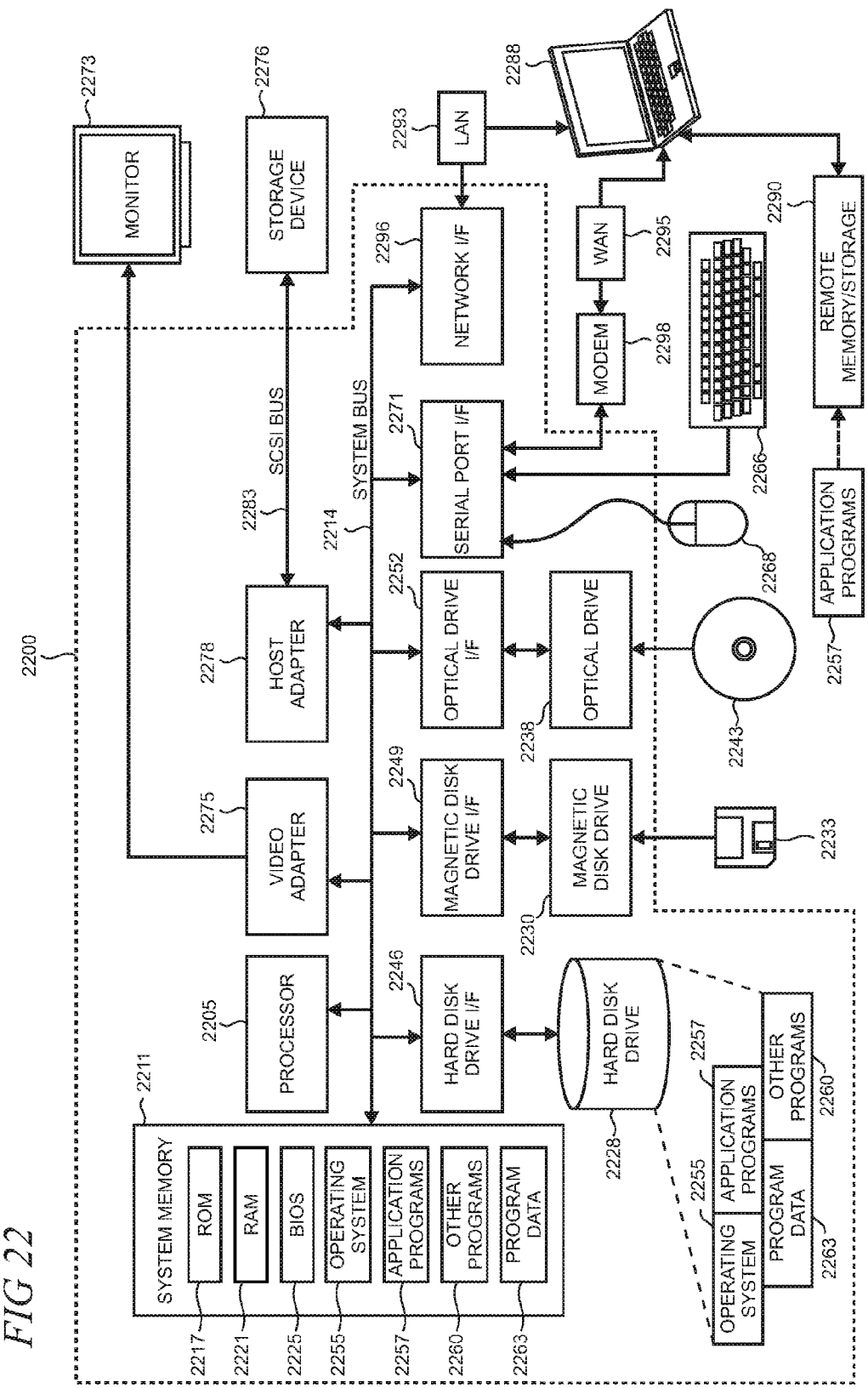
FIG. 22 is a simplified block diagram of an illustrative remote service or computer system that may be used in part to implement the present techniques to set focus in camera in a mixed-reality environment with hand gesture interaction.

FIG. 22 is a simplified block diagram of an illustrative computer system 2200 such as a PC (personal computer) or server with which the present techniques to set focus in camera in a mixed-reality environment with hand gesture interaction may be implemented. For example, the HMD device 110 may communicate with the computer system 2200. Computer system 2200 includes a processor 2205, a system memory 2211, and a system bus 2214 that couples various system components including the system memory 2211 to the processor 2205. The system bus 2214 may be any of several types of bus structures including a memory bus or memory controller, a peripheral bus, or a local bus using any of a variety of bus architectures. The system memory 2211 includes read only memory (ROM) 2217 and random-access memory (RAM) 2221. A basic input/output system (BIOS) 2225, containing the basic routines that help to transfer information between elements within the computer system 2200, such as during startup, is stored in ROM 2217. The computer system 2200 may further include a hard disk drive 2228 for reading from and writing to an internally disposed hard disk (not shown), a magnetic disk drive 2230 for reading from or writing to a removable magnetic disk 2233 (e.g., a floppy disk), and an optical disk drive 2238 for reading from or writing to a removable optical disk 2243 such as a CD (compact disc), DVD (digital versatile disc), or other optical media. The hard disk drive 2228, magnetic disk drive 2230, and optical disk drive 2238 are connected to the system bus 2214 by a hard disk drive interface 2246, a magnetic disk drive interface 2249, and an optical drive interface 2252, respectively. The drives and their associated computer-readable storage media provide non-volatile storage of computer-readable instructions, data structures, program modules, and other data for the computer system 2200. Although this illustrative example includes a hard disk, a removable magnetic disk 2233, and a removable optical disk 2243, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present techniques to set focus in camera in a mixed-reality environment with hand gesture interaction. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 2233, optical disk 2243, ROM 2217, or RAM 2221, including an operating system 2255, one or more application programs 2257, other program modules 2260, and program data 2263. A user may enter commands and information into the computer system 2200 through input devices such as a keyboard 2266 and pointing device 2268 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 2205 through a serial port interface 2271 that is coupled to the system bus 2214, but may be connected by other interfaces, such as a parallel port, game port, or universal serial bus (USB). A monitor 2273 or other type of display device is also connected to the system bus 2214 via an interface, such as a video adapter 2275. In addition to the monitor 2273, personal computers typically include other peripheral output devices (not shown), such as speakers and printers. The illustrative example shown in FIG. 22 also includes a host adapter 2278, a Small Computer System Interface (SCSI) bus 2283, and an external storage device 2276 connected to the SCSI bus 2283.

The computer system 2200 is operable in a networked environment using logical connections to one or more remote computers, such as a remote computer 2288. The remote computer 2288 may be selected as another personal computer, a server, a router, a network PC, a peer device, or other common network node, and typically includes many or all of the elements described above relative to the computer system 2200, although only a single representative remote memory/storage device 2290 is shown in FIG. 22. The logical connections depicted in FIG. 22 include a local area network (LAN) 2293 and a wide area network (WAN) 2295. Such networking environments are often deployed, for example, in offices, enterprise-wide computer networks, intranets, and the Internet.

When used in a LAN networking environment, the computer system 2200 is connected to the local area network 2293 through a network interface or adapter 2296. When used in a WAN networking environment, the computer system 2200 typically includes a broadband modem 2298, network gateway, or other means for establishing communications over the wide area network 2295, such as the Internet. The broadband modem 2298, which may be internal or external, is connected to the system bus 2214 via a serial port interface 2271. In a networked environment, program modules related to the computer system 2200, or portions thereof, may be stored in the remote memory storage device 2290. It is noted that the network connections shown in FIG. 22 are illustrative and other means of establishing a communications link between the computers may be used depending on the specific requirements of an application of the present techniques to set focus in camera in a mixed-reality environment with hand gesture interaction.

Figure 23:
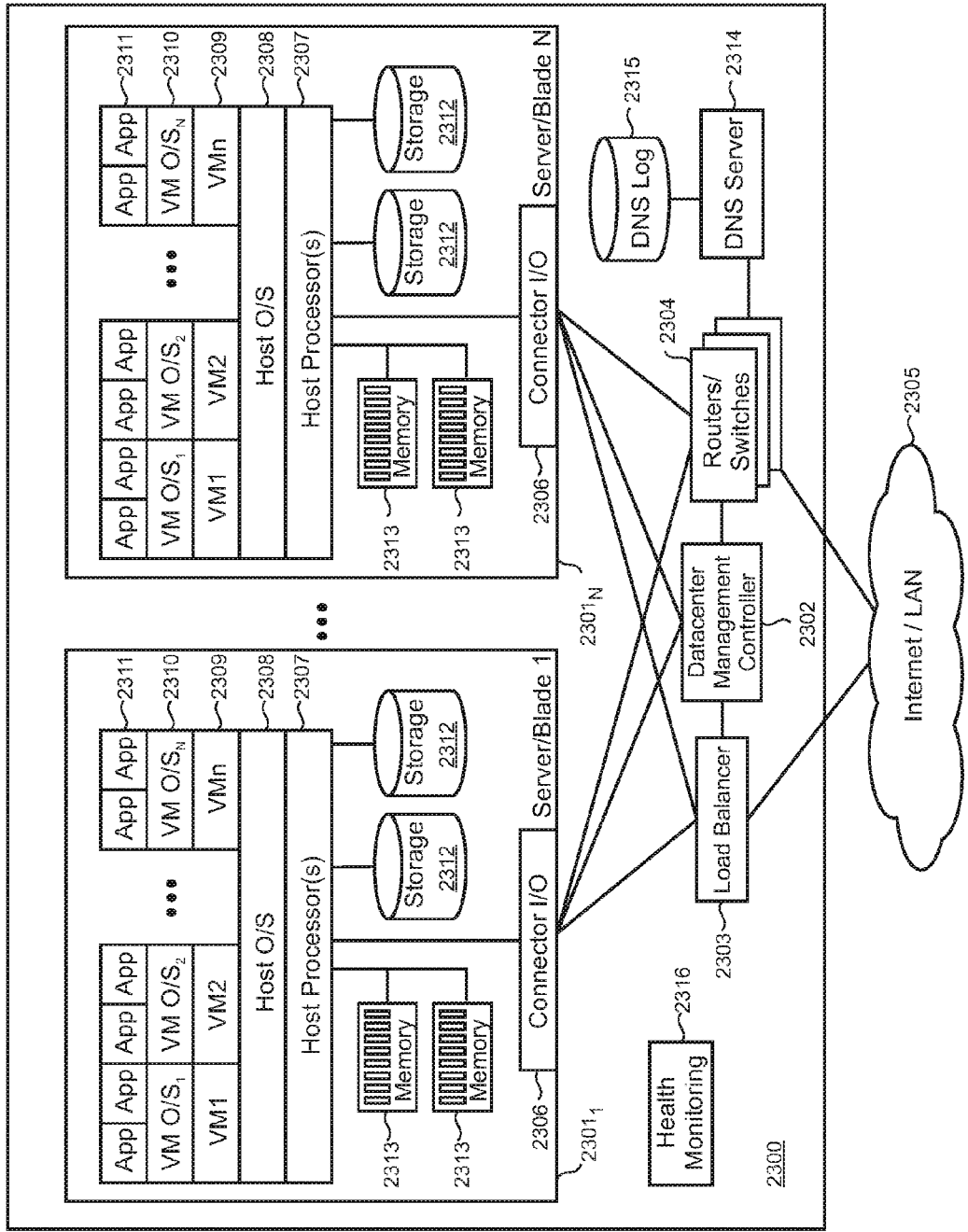
FIG. 23 is a block diagram of an illustrative datacenter that may be used at least in part to implement the present techniques to set focus in camera in a mixed-reality environment with hand gesture interaction.

FIG. 23 is a high-level block diagram of an illustrative datacenter 2300 that provides cloud computing services or distributed computing services that may be used to implement the present techniques to set focus in camera in a mixed-reality environment with hand gesture interaction. For example, the HMD device 105 may utilize the solutions offered by the datacenter 2300, such as receive streaming content. A plurality of servers 2301 are managed by datacenter management controller 2302. Load balancer 2303 distributes requests and computing workloads over servers 2301 to avoid a situation wherein a single server may become overwhelmed. Load balancer 2303 maximizes available capacity and performance of the resources in datacenter 2300. Routers/switches 2304 support data traffic between servers 2301 and between datacenter 2300 and external resources and users (not shown) via an external network 2305, which may be, for example, a local area network (LAN) or the Internet.

Servers 2301 may be standalone computing devices, and/or they may be configured as individual blades in a rack of one or more server devices. Servers 2301 have an input/output (I/O) connector 2306 that manages communication with other database entities. One or more host processors 2307 on each server 2301 run a host operating system (O/S) 2308 that supports multiple virtual machines (VM) 2309. Each VM 2309 may run its own O/S so that each VM O/S 2310 on a server is different, or the same, or a mix of both. The VM O/S's 2310 may be, for example, different versions of the same O/S (e.g., different VMs running different current and legacy versions of the Windows® operating system). In addition, or alternatively, the VM O/S's 2310 may be provided by different manufacturers (e.g., some VMs running the Windows® operating system, while other VMs are running the Linux® operating system). Each VM 2309 may also run one or more applications (Apps) 2311. Each server 2301 also includes storage 2312 (e.g., hard disk drives (HDD)) and memory 2313 (e.g., RAM) that can be accessed and used by the host processors 2307 and VMs 2309 for storing software code, data, etc. In one embodiment, a VM 2309 may employ the data plane APIs as disclosed herein.

Datacenter 2300 provides pooled resources on which customers can dynamically provision and scale applications as needed without having to add servers or additional networking. This allows customers to obtain the computing resources they need without having to procure, provision, and manage infrastructure on a per-application, ad-hoc basis. A cloud computing datacenter 2300 allows customers to scale up or scale down resources dynamically to meet the current needs of their business. Additionally, a datacenter operator can provide usage-based services to customers so that they pay for only the resources they use, when they need to use them. For example, a customer may initially use one VM 2309 on server 2301$_1$ to run their applications 2311. When demand for an application 2311 increases, the datacenter 2300 may activate additional VMs 2309 on the same server $2301_1$ and/or on a new server $2301_N$ as needed. These additional VMs 2309 can be deactivated if demand for the application later drops.

Datacenter 2300 may offer guaranteed availability, disaster recovery, and back-up services. For example, the datacenter may designate one VM 2309 on server $2301_1$ as the primary location for the customer's applications and may activate a second VM 2309 on the same or different server as a standby or back-up in case the first VM or server $2301_1$ fails. Datacenter management controller 2302 automatically shifts incoming user requests from the primary VM to the back-up VM without requiring customer intervention. Although datacenter 2300 is illustrated as a single location, it will be understood that servers 2301 may be distributed to multiple locations across the globe to provide additional redundancy and disaster recovery capabilities. Additionally, datacenter 2300 may be an on-premises, private system that provides services to a single enterprise user or may be a publicly accessible, distributed system that provides services to multiple, unrelated customers or may be a combination of both.

Domain Name System (DNS) server 2314 resolves domain and host names into IP (Internet Protocol) addresses for all roles, applications, and services in datacenter 2300. DNS log 2315 maintains a record of which domain names have been resolved by role. It will be understood that DNS is used herein as an example and that other name resolution services and domain name logging services may be used to identify dependencies.

Datacenter health monitoring 2316 monitors the health of the physical systems, software, and environment in datacenter 2300. Health monitoring 2316 provides feedback to datacenter managers when problems are detected with servers, blades, processors, or applications in datacenter 2300 or when network bandwidth or communications issues arise.

Figure 24:
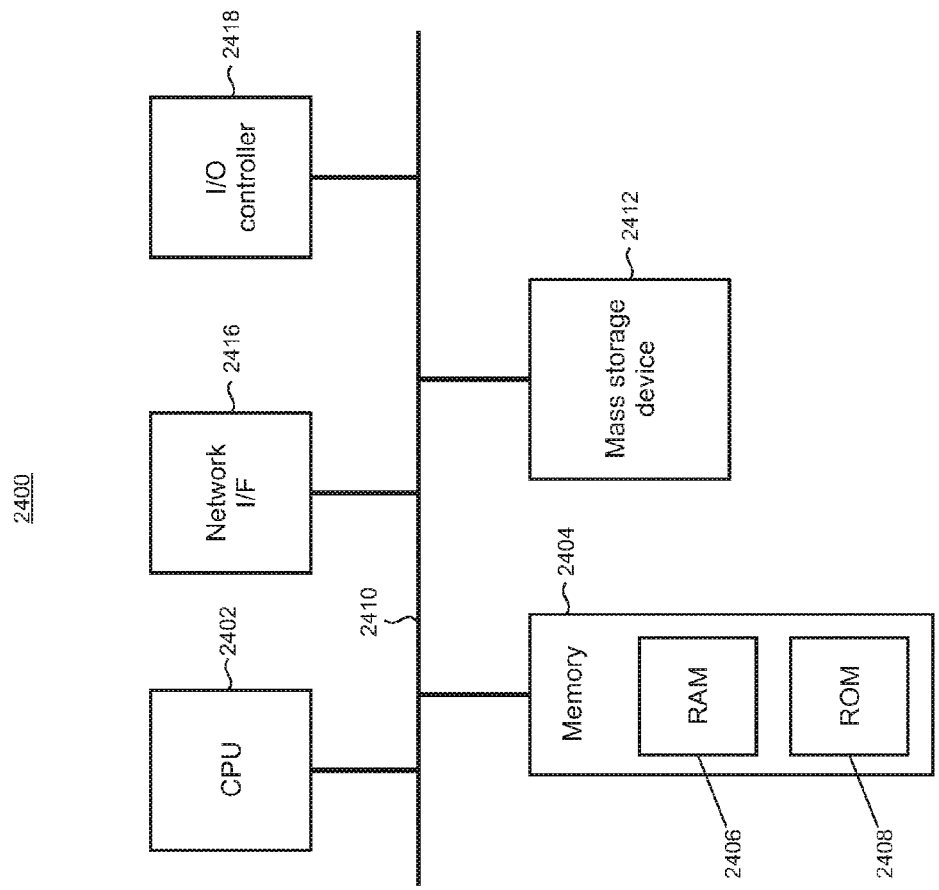
FIG. 24 is a simplified block diagram of an illustrative architecture of a computing device, such as a smartphone or tablet computer, that may be used to implement the present techniques to set focus in camera in a mixed-reality environment with hand gesture interaction.

FIG. 24 shows an illustrative architecture 2400 for a computing device such as a smartphone, tablet computer, laptop computer, or personal computer for the present techniques to set focus in camera in a mixed-reality environment with hand gesture interaction. The computing device in FIG. 24 may be an alternative to the HMD device 110 that can also benefit from reducing a hunting effect in an auto-focus subsystem. While some components are depicted in FIG. 24, other components disclosed herein but not shown are also possible with the computing device.

The architecture 2400 illustrated in FIG. 24 includes one or more processors 2402 (e.g., central processing unit, dedicated Artificial Intelligence chip, graphics processing unit, etc.), a system memory 2404, including RAM (random access memory) 2406 and ROM (read only memory) 2408, and a system bus 2410 that operatively and functionally couples the components in the architecture 2400. A basic input/output system containing the basic routines that help to transfer information between elements within the architecture 2400, such as during startup, is typically stored in the ROM 2408. The architecture 2400 further includes a mass storage device 2412 for storing software code or other computer-executed code that is utilized to implement applications, the file system, and the operating system. The mass storage device 2412 is connected to the processor 2402 through a mass storage controller (not shown) connected to the bus 2410. The mass storage device 2412 and its associated computer-readable storage media provide non-volatile storage for the architecture 2400. Although the description of computer-readable storage media contained herein refers to a mass storage device, such as a hard disk or CD-ROM drive, it may be appreciated by those skilled in the art that computer-readable storage media can be any available storage media that can be accessed by the architecture 2400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray or other optical storage, magnetic cassette, magnetic tape, magnetic disk storage or other magnetic storage device, or any other medium which can be used to store the desired information and which can be accessed by the architecture 2400.

According to various embodiments, the architecture 2400 may operate in a networked environment using logical connections to remote computers through a network. The architecture 2400 may connect to the network through a network interface unit 2416 connected to the bus 2410. It may be appreciated that the network interface unit 2416 also may be utilized to connect to other types of networks and remote computer systems. The architecture 2400 also may include an input/output controller 2418 for receiving and processing input from a number of other devices, including a keyboard, mouse, touchpad, touchscreen, control devices such as buttons and switches or electronic stylus (not shown in FIG. 24). Similarly, the input/output controller 2418 may provide output to a display screen, user interface, a printer, or other type of output device (also not shown in FIG. 24).

It may be appreciated that the software components described herein may, when loaded into the processor 2402 and executed, transform the processor 2402 and the overall architecture 2400 from a general-purpose computing system into a special-purpose computing system customized to facilitate the functionality presented herein. The processor 2402 may be constructed from any number of transistors or other discrete circuit elements, which may individually or collectively assume any number of states. More specifically, the processor 2402 may operate as a finite-state machine, in response to executable instructions contained within the software modules disclosed herein. These computer-executable instructions may transform the processor 2402 by specifying how the processor 2402 transitions between states, thereby transforming the transistors or other discrete hardware elements constituting the processor 2402.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 2400 in order to store and execute the software components presented herein. It also may be appreciated that the architecture 2400 may include other types of computing devices, including wearable devices, handheld computers, embedded computer systems, smartphones, PDAs, and other types of computing devices known to those skilled in the art. It is also contemplated that the architecture 2400 may not include all of the components shown in FIG. 24, may include other components that are not explicitly shown in FIG. 24, or may utilize an architecture completely different from that shown in FIG. 24.

Figure 25:
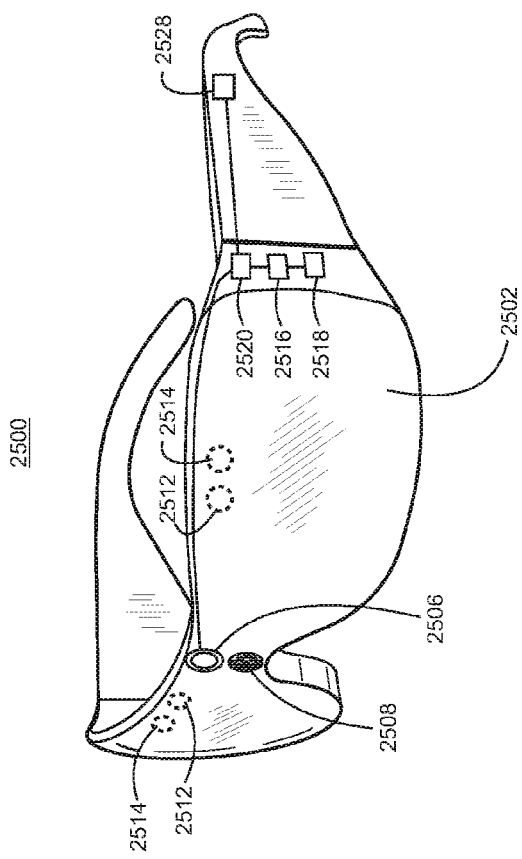
FIG. 25 is a pictorial view of an illustrative example of a mixed-reality HMD device.
Figure 26:
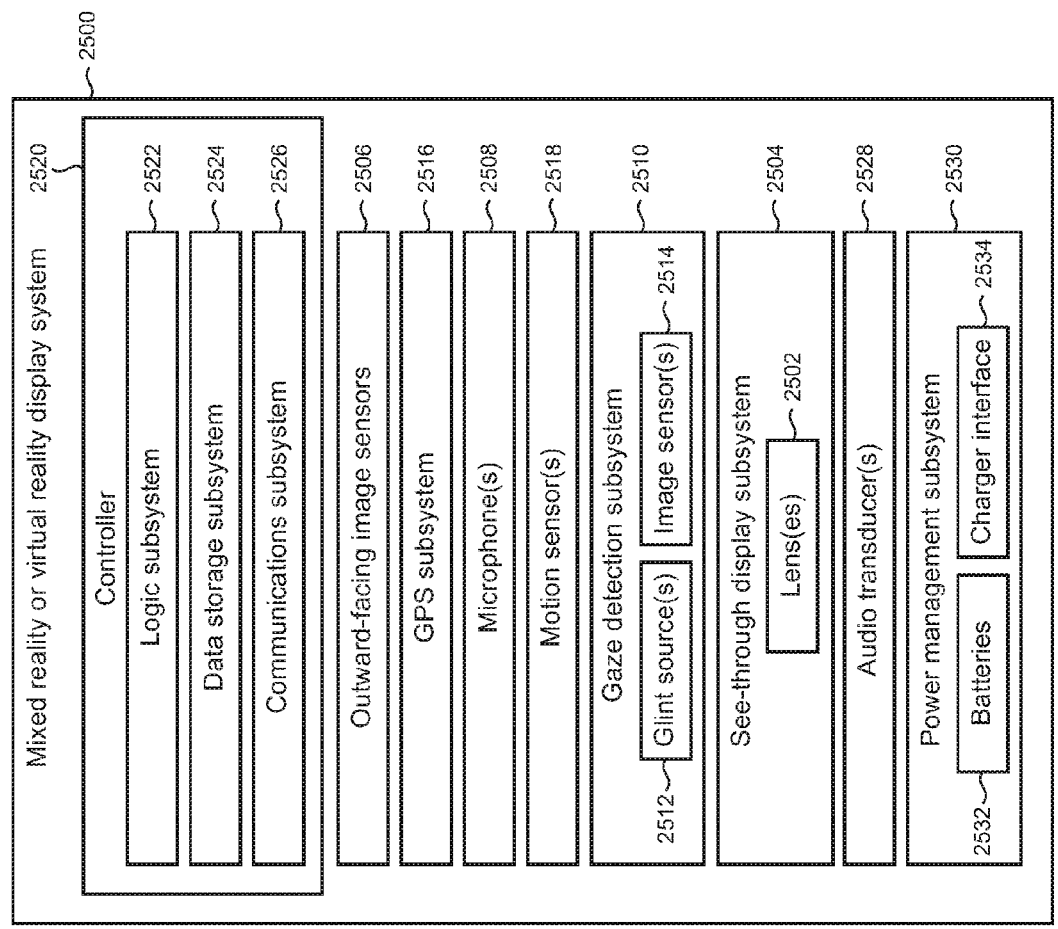
FIG. 26 is a block diagram of the illustrative example of the mixed-reality HMD device.

FIG. 25 shows one particular illustrative example of a see-through, mixed-reality display system 2500, and FIG. 26 shows a functional block diagram of the system 2500. The illustrative display system 2500 provides a supplemental description to the HMD device 110 depicted throughout the figures. Display system 2500 comprises one or more lenses 2502 that form a part of a see-through display subsystem 2504, such that images may be displayed using lenses 2502 (e.g. using projection onto lenses 2502, one or more waveguide systems incorporated into the lenses 2502, and/or in any other suitable manner). Display system 2500 further comprises one or more outward-facing image sensors 2506 configured to acquire images of a background scene and/or physical environment being viewed by a user, and may include one or more microphones 2508 configured to detect sounds, such as voice commands from a user. Outward-facing image sensors 2506 may include one or more depth sensors and/or one or more two-dimensional image sensors. In alternative arrangements, as noted above, a mixed-reality or virtual reality display system, instead of incorporating a see-through display subsystem, may display mixed-reality or virtual reality images through a viewfinder mode for an outward-facing image sensor.

The display system 2500 may further include a gaze detection subsystem 2510 configured for detecting a direction of gaze of each eye of a user or a direction or location of focus, as described above. Gaze detection subsystem 2510 may be configured to determine gaze directions of each of a user's eyes in any suitable manner. For example, in the illustrative example shown, a gaze detection subsystem 2510 includes one or more glint sources 2512, such as infrared light sources, that are configured to cause a glint of light to reflect from each eyeball of a user, and one or more image sensors 2514, such as inward-facing sensors, that are configured to capture an image of each eyeball of the user. Changes in the glints from the user's eyeballs and/or a location of a user's pupil, as determined from image data gathered using the image sensor(s) 2514, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 2510 may have any suitable number and arrangement of light sources and image sensors. In some implementations, the gaze detection subsystem 2510 may be omitted.

The display system 2500 may also include additional sensors. For example, display system 2500 may comprise a global positioning system (GPS) subsystem 2516 to allow a location of the display system 2500 to be determined. This may help to identify real-world objects, such as buildings, etc. that may be located in the user's adjoining physical environment.

The display system 2500 may further include one or more motion sensors 2518 (e.g., inertial, multi-axis gyroscopic, or acceleration sensors) to detect movement and position/orientation/pose of a user's head when the user is wearing the system as part of a mixed-reality or virtual reality HMD device. Motion data may be used, potentially along with eye-tracking glint data and outward-facing image data, for gaze detection, as well as for image stabilization to help correct for blur in images from the outward-facing image sensor(s) 2506. The use of motion data may allow changes in gaze location to be tracked even if image data from outward-facing image sensor(s) 2506 cannot be resolved.

In addition, motion sensors 2518, as well as microphone(s) 2508 and gaze detection subsystem 2510, also may be employed as user input devices, such that a user may interact with the display system 2500 via gestures of the eye, neck and/or head, as well as via verbal commands in some cases. It may be understood that sensors illustrated in FIGS. 25 and 26 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 2500 can further include a controller 2520 having a logic subsystem 2522 and a data storage subsystem 2524 in communication with the sensors, gaze detection subsystem 2510, display subsystem 2504, and/or other components through a communications subsystem 2526. The communications subsystem 2526 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 2524 may include instructions stored thereon that are executable by logic subsystem 2522, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 2500 is configured with one or more audio transducers 2528 (e.g., speakers, earphones, etc.) so that audio can be utilized as part of a mixed-reality or virtual reality experience. A power management subsystem 2530 may include one or more batteries 2532 and/or protection circuit modules (PCMs) and an associated charger interface 2534 and/or remote power interface for supplying power to components in the display system 2500.

It may be appreciated that the display system 2500 is described for the purpose of example, and thus is not meant to be limiting. It is to be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Various exemplary embodiments of the present techniques to set focus in camera in a mixed-reality environment with hand gesture interaction are now presented by way of illustration and not as an exhaustive list of all embodiments. An example includes a method performed by a head-mounted display (HMD) device to optimize an auto-focus implementation, comprising: enabling auto-focus operations for a camera, in the HMD device, that is configured to capture a scene in a local physical environment surrounding the HMD device over a field of view (FOV), wherein the camera is a member of a set of one or more sensors that are operatively coupled to the HMD device; collecting data on a user's hands using the set of sensors; and suppressing the auto-focus operations for the camera based on the collected data on the user's hands failing to satisfy one or more criteria of an auto-focus subsystem.

In another example, the set of sensors gather data which describes the local physical environment in which the HMD device operates. In another example, the HMD device includes a see-through mixed-reality display through which a local user observes the local physical environment, and on which the HMD device renders one or more virtual objects. In another example, the scene captured by the camera over the FOV and the rendered virtual objects are transmitted as content to a remote computing device. In another example, the scene captured by the camera over the FOV and the rendered virtual objects are mixed by the HMD device into a composite signal that is recorded. In another example, the method further comprises designating a region of interest (ROI) within the FOV, and wherein a criterion of the auto-focus subsystem includes the collected data indicating that one or more of the user's hands are local within the ROI. In another example, the ROI includes a three-dimensional space in the local physical environment. In another example, the ROI is dynamically variable in at least one of size, shape, or location. In another example, the method further comprises assessing characteristics of the one or more hands to determine whether the collected data on the user's hands satisfy one or more criterion of the auto-focus subsystem. In another example, the characteristics of the hands include a pace of hand movements. In another example, the characteristics of the hands include what part of a hand. In another example, the characteristics of the hands include a duration of time that the one or more hands are positioned in the ROI. In another example, the characteristics of the hands include a size of the one or more hands. In another example, the characteristics of the hands include a pose of the one or more hands. In another example, the characteristics of the hands include a direction of motion for the one or more hands. In another example, the camera comprises a PV (Photo/Video) camera and the set of sensors includes a depth sensor that is configured to collect depth data in the local physical environment to thereby track one or more of the HMD device user's hands.

A further example includes one or more hardware-based non-transitory computer-readable memory devices storing computer-readable instructions which, when executed by one or more processors in a computing device, cause the computing device to: capture data to track one or more hands of a user while the user is using the computing device in a physical environment; select a region of interest (ROI) within a field of view (FOV) of the computing device, in which the computing device renders one or more virtual objects on a see-through display coupled to the computing device to enable the user to simultaneously view the physical environment and the one or more virtual objects as a mixed-reality user experience; determine, from the captured hand tracking data, whether parts of the user's one or more hands are located within the ROI; and in response to the determining, trigger or disable an auto-focus operation of a camera, disposed on the computing device, that is configured to capture a scene comprising at least a portion of the physical environment in the FOV, in which the auto-focus operation is triggered responsive to characteristics of the one or more hands, derived from the captured hand tracking data, indicating that the user's one or more hands are the user's point of focus within the ROI; and the auto-focus operation is disabled responsive to characteristics of the one or more hands, derived from the captured hand tracking data, indicating that the user's one or more hands are transitory in the ROI.

In another example, the captured hand tracking data is from a front-facing depth sensor that is operatively coupled to the computing device. In another example, the computing device includes a head-mounted display (HMD) device, a smartphone, a tablet computer, or a portable computer. In another example, the ROI is located at a central region of the FOV. In another example, the executed instructions further cause the computing device to coordinate the captured hand tracking data in the physical environment within the ROI of the FOV.

A further example includes a computing device configurable to be worn on a head of a user, the computing device configured to reduce unwanted hunting effects of an auto-focus subsystem associated with the computing device, comprising: a display configured to render holograms; an adjustable-focus PV (picture/video) camera that is operatively coupled to the auto-focus subsystem and that is configured to capture adjustably-focused images of a physical environment in which the user is located; a depth sensor configured to capture depth data pertaining to the physical environment in three dimensions; one or more processors; and one or more hardware-based memory devices storing computer-readable instructions which, when executed by the one or more processors, cause the computing device to: render at least one hologram on the display, the hologram comprising a virtual object that is located in the physical environment at a known location; capture, using the depth sensor, location tracking data for a user's one or more hands within the physical environment; determine from the location tracking data whether the user's one or more hands are interacting with the hologram at the known location; trigger operations of the auto-focus subsystem in response to a determination that the user's one or more hands are not interacting with the hologram; and suppress operations of the auto-focus subsystem in response to a determination that the user's one or more hands are interacting with the hologram.

In another example, operations of the auto-focus subsystem are suppressed in response to a determination from the location tracking data that the user's one or more hands are interacting with the hologram using an in-out movement.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method performed by a head-mounted display (HMD) device operable by a user to optimize an auto-focus implementation, comprising:
   enabling auto-focus operations for a camera in the HMD device, the camera being configured to capture a scene in a local physical environment surrounding the HMD device over a field of view (FOV);
   detecting, using a gaze detection subsystem comprising a sensor in the HMD device, a location of focus of an eye of the user within the FOV; and
   controlling, using the location of focus in the FOV, the auto-focus operations for the camera according to a criterion of an auto-focus subsystem, the criterion indicating that the user is interacting with a virtual object within the FOV.

2. The method of claim 1, wherein the virtual object includes a tag that identifies a business, a direction to a place of interest, and a gift box.

3. The method of claim 1, wherein the virtual object is positioned relative to the local physical environment.

4. The method of claim 1, wherein the interaction with the virtual object includes moving, selecting, shrinking, or enlarging the virtual object.

5. The method of claim 1, wherein the interaction occurs at a spatial distance away from a location of the virtual object.

6. The method of claim 1, further comprising rendering content from the HMD device to a computing device, the content including the interaction of the user.

7. The method of claim 1, wherein the FOV includes a statically or dynamically defined region of interest (ROI), wherein the user is unaware of the ROI.

8. The method of claim 7, wherein the auto-focus operations for the camera comprise automatically focusing on content within the ROI according to the criterion.

9. A method comprising:
   enabling auto-focus operations for a camera in a head-mounted display (HMD) device of a user, the camera being configured to capture a scene in a physical environment surrounding the HMD device over a field of view (FOV);
   controlling, using a location of focus of the user within the FOV, the auto-focus operations for the camera according to a criterion, the criterion indicating that the user is interacting with a virtual object within the FOV; and
   rendering content from the HMD device of the user on a computing device of a remote user, the content including the interaction with the virtual object.

10. The method of claim 9, wherein the virtual object includes a tag that identifies a business, a direction to a place of interest, and a gift box.

11. The method of claim 9, wherein the virtual object is positioned relative to the user.

12. The method of claim 9, wherein the interaction with the virtual object includes moving, selecting, shrinking, or enlarging the virtual object.

13. The method of claim 9, wherein the interaction occurs at a spatial distance away from a location of the virtual object.

14. The method of claim 9, wherein the FOV includes a statically or dynamically defined region of interest (ROI), wherein the user is unaware of the ROI.

15. The method of claim 14, wherein the auto-focus operations for the camera comprise automatically focusing within the ROI according to the criterion.

16. A head-mounted display (HMD) device comprising:
   a camera configured to capture a scene in a physical environment surrounding the HMD device over a field of view (FOV);
   a processor; and
   a memory storing instructions which, when executed by the processor, cause the HMD device to:
   enable auto-focus operations for the camera;
   detect a location of focus within the FOV; and
   controlling, using the detected location of focus, the auto-focus operations for the camera according to a criterion, the criterion indicating that a user is interacting with a virtual object within the FOV.

17. The HMD device of claim 16, wherein the interaction occurs at a spatial distance away from a location of the virtual object.

18. The HMD device of claim 16, the instructions when executed by the processor further cause the HMD device to render content from the HMD device of the user to a computing device of a remote user, the content including rendering the interaction of the user on the computing device of the remote user.

19. The HMD device of claim 16, wherein the FOV includes a statically or dynamically defined region of interest (ROI), wherein the user is unaware of the ROI.

20. The HMD device of claim 19, wherein the auto-focus operations for the camera comprise automatically focusing on content within the ROI according to the criterion.

* * * * *